United States Patent
Kobayashi et al.

(10) Patent No.: US 9,601,247 B2
(45) Date of Patent: Mar. 21, 2017

(54) SINTERED FERRITE MAGNET AND ITS PRODUCTION METHOD

(71) Applicant: HITACHI METALS, LTD., Minato-ku, Tokyo (JP)

(72) Inventors: Yoshinori Kobayashi, Osaka (JP); Seiichi Hosokawa, Osaka (JP); Etsushi Oda, Osaka (JP)

(73) Assignee: HITACHI METALS, LTD., Tokyo (JP)

(*) Notice: Subject to any disclaimer, the term of this patent is extended or adjusted under 35 U.S.C. 154(b) by 56 days.

(21) Appl. No.: 14/417,678

(22) PCT Filed: Jul. 24, 2013

(86) PCT No.: PCT/JP2013/069983
§ 371 (c)(1),
(2) Date: Jan. 27, 2015

(87) PCT Pub. No.: WO2014/021149
PCT Pub. Date: Feb. 6, 2014

(65) Prior Publication Data
US 2015/0221424 A1    Aug. 6, 2015

(30) Foreign Application Priority Data

Jul. 31, 2012 (JP) .................. 2012-169569

(51) Int. Cl.
H01F 41/02   (2006.01)
H01F 1/11    (2006.01)
C04B 35/26   (2006.01)
C04B 35/40   (2006.01)
C04B 35/626  (2006.01)
C01G 49/00   (2006.01)
C01G 51/00   (2006.01)

(52) U.S. Cl.
CPC ........... *H01F 1/11* (2013.01); *C01G 49/0054* (2013.01); *C01G 51/40* (2013.01); *C04B 35/2633* (2013.01); *C04B 35/2641* (2013.01); *C04B 35/62685* (2013.01); *H01F 41/0266* (2013.01); *C01P 2004/62* (2013.01); *C01P 2006/42* (2013.01); *C04B 2235/3208* (2013.01); *C04B 2235/3213* (2013.01); *C04B 2235/3215* (2013.01); *C04B 2235/3227* (2013.01); *C04B 2235/3275* (2013.01); *C04B 2235/3277* (2013.01); *C04B 2235/3418* (2013.01); *C04B 2235/605* (2013.01); *C04B 2235/6562* (2013.01); *C04B 2235/6565* (2013.01); *C04B 2235/767* (2013.01); *C04B 2235/786* (2013.01); *C04B 2235/85* (2013.01)

(58) Field of Classification Search
CPC ......... H01F 1/10; H01F 1/34; C04B 35/2641; C04B 35/64; C04B 2235/3208; C04B 2235/6562; C04B 2235/6565
See application file for complete search history.

(56) References Cited

U.S. PATENT DOCUMENTS

| | | |
|---|---|---|
| 6,139,766 A | 10/2000 | Taguchi et al. |
| 6,402,980 B1 | 6/2002 | Taguchi et al. |
| 7,758,767 B2 | 7/2010 | Kobayashi et al. |
| 7,837,893 B2 | 11/2010 | Takami et al. |
| 8,021,567 B2 | 9/2011 | Takami et al. |
| 8,206,606 B2 | 6/2012 | Hosokawa et al. |
| 2007/0194269 A1 | 8/2007 | Kobayashi et al. |
| 2009/0022992 A1 | 1/2009 | Takami et al. |
| 2009/0261288 A1 | 10/2009 | Hosokawa et al. |
| 2010/0237273 A1 | 9/2010 | Kobayashi et al. |
| 2011/0024672 A1 | 2/2011 | Takami et al. |

(Continued)

FOREIGN PATENT DOCUMENTS

| | | |
|---|---|---|
| JP | 10-149910 A | 6/1998 |
| JP | 11-154604 A | 6/1999 |

(Continued)

OTHER PUBLICATIONS

Translation for JP 2001-223104, Aug. 17, 2001.*
International Search Report of PCT/JP2013/069983 dated Oct. 29, 2013 [PCT/ISA/210].
Communication dated Feb. 16, 2016, issued by the European Patent Office in corresponding European Application No. 13824900.8.

*Primary Examiner* — Carol M Koslow
(74) *Attorney, Agent, or Firm* — Sughrue Mion, PLLC

(57) ABSTRACT

A sintered ferrite magnet comprising main phases of ferrite having a hexagonal M-type magnetoplumbite structure, first grain boundary phases existing between two main phases, and second grain boundary phases existing among three or more main phases, the second grain boundary phases being dispersed in its arbitrary cross section, and the second grain boundary phases having an average area of less than 0.2 $\mu m^2$, are produced by calcining, pulverizing, molding and sintering raw material powders having the general formula of $Ca_{1-x-y}La_xA_yFe_{2n-z}Co_z$, wherein 1−x−y, x, y and z and n representing a molar ratio are in desired ranges; 1.8% or less by mass of $SiO_2$ and 2% or less by mass (as CaO) of $CaCO_3$ being added to a calcined body after calcining and before molding; and the sintering step being conducted with a temperature-elevating speed of 1-4° C./minute in a range from 1100° C. to a sintering temperature, and a temperature-lowering speed of 6° C./minute or more in a range from the sintering temperature to 1100° C.

6 Claims, 11 Drawing Sheets

(56) References Cited

U.S. PATENT DOCUMENTS

| | | | | |
|---|---|---|---|---|
| 2012/0105185 | A1* | 5/2012 | Oda | C04B 35/2633 335/302 |
| 2013/0285779 | A1* | 10/2013 | Kobayashi | C01G 49/0054 335/302 |

FOREIGN PATENT DOCUMENTS

| | | | |
|---|---|---|---|
| JP | 2000-277312 A | | 10/2000 |
| JP | 3181559 B2 | | 7/2001 |
| JP | 2001-223104 | * | 8/2001 |
| JP | 2001-223104 A | | 8/2001 |
| JP | 2002-104872 A | | 4/2002 |
| JP | 2003-297623 A | | 10/2003 |
| JP | 2006-104050 A | | 4/2006 |
| JP | 2012-209295 A | | 10/2012 |
| WO | 2007/060757 A1 | | 5/2007 |
| WO | 2007/077811 A1 | | 7/2007 |
| WO | 2011/001831 A1 | | 1/2011 |
| WO | 2012/090935 A1 | | 7/2012 |
| WO | WO 2012/090935 | * | 7/2012 |

* cited by examiner

10 μm    1 μm

10 μm          1 μm

10 μm    1 μm

10 μm      1 μm

10 μm   1 μm

10 μm

SINTERED FERRITE MAGNET AND ITS PRODUCTION METHOD

CROSS REFERENCE TO RELATED APPLICATIONS

This application is a National Stage of International Application No. PCT/JP2013/069983, filed Jul. 24, 2013 (claiming priority based on Japanese Patent Application No. 2012-169569, filed Jul. 31, 2012), the contents of which are incorporated herein by reference in their entirety.

FIELD OF THE INVENTION

The present invention relates to a method for producing a sintered ferrite magnet, and a sintered ferrite magnet.

BACKGROUND OF THE INVENTION

Sintered ferrite magnets are used in various applications such as motors, electric generators, speakers, etc. As typical sintered ferrite magnets, Sr ferrite ($SrFe_{12}O_{19}$) and Ba ferrite ($BaFe_{12}O_{19}$) having a hexagonal M-type magnetoplumbite structure are known. These sintered ferrite magnets are produced relatively inexpensively by a powder metallurgy method using iron oxide, and carbonate of strontium (Sr) or barium (Ba), etc. as raw materials.

To provide electric parts of automobiles, parts of electric equipments, etc. with reduced sizes and weights and higher efficiency for environmental protection, etc., sintered ferrite magnets are recently required to have high performance. Particularly demanded in motors used in electric parts of automobiles are sintered ferrite magnets having such high coercivity $H_{cJ}$ and high rectangularity $H_k/H_{cJ}$ that they are not demagnetized by a strong demagnetizing field even when made thinner, while keeping high residual magnetic flux densities $B_r$.

To provide sintered ferrite magnets with improved magnetic properties, JP 10-149910 A and JP 11-154604 A propose methods for improving $H_{cJ}$ and $B_r$ by substituting part of Sr with rare earth elements such as La, etc. and part of Fe with Co in the above Sr ferrites.

Sr ferrites having part of Sr substituted by rare earth elements such as La, etc. for, and part of Fe substituted by Co, etc. (hereinafter referring to as "SrLaCo ferrite"), which are described in JP 10-149910 A and JP 11-154604 A, have excellent magnetic properties, so that they are widely used in various applications in place of conventional Sr ferrites and Ba ferrites. However, further improvement of magnetic properties is desired.

JP 2001-223104 A proposes a temperature-elevating speed of 1-5° C./minute in a temperature range from 900° C. to the highest temperature, in a temperature-elevating process in the sintering step, to improve the $H_{cJ}$ of the SrLaCo ferrite. JP 2001-223104 A describes in Examples that in the composition of $Sr_{1-x}La_x(Fe_{12-y}Co_y)_zO_{19}$, the $H_{cJ}$ is improved by a temperature-elevating speed of 1-5° C./minute. JP 2001-223104 A describes that the temperature-lowering speed is not particularly restricted, but usually 1-20° C./minute, specifically 5° C./minute in Examples. Temperature-elevating speeds in particular ranges in the sintering step for improving the $H_{cJ}$ of SrLaCo ferrites are proposed by JP 2000-277312 A, JP 2003-297623 A, etc. in addition to JP 2001-223104 A.

As sintered ferrite magnets, Ca ferrites are known in addition to the above Sr ferrites and Ba ferrites. It is known that Ca ferrites have a stable structure expressed by the composition formula of $CaO-Fe_2O_3$ or $CaO-2Fe_2O_3$, and that La added provides the ferrites with a hexagonal crystal structure. However, they have magnetic properties on the same level as those of conventional Ba ferrites, not sufficiently high.

Japanese Patent 3181559 discloses a Ca ferrite having part of Ca substituted by rare earth elements such as La, etc., and part of Fe substituted by Co, etc. for improved $B_r$ and $H_{cJ}$, and improved temperature characteristics of $H_{cJ}$, by having an anisotropic magnetic field $H_A$ of 20 kOe or more (hereinafter referring to "CaLaCo ferrite"). It describes that this anisotropic magnetic field $H_A$ is 10% or more higher than that of Sr ferrites.

However, CaLaCo ferrites have $B_r$ and $H_{cJ}$ on the same level as those of SrLaCo ferrites and extremely poor $H_k/H_{cJ}$, despite a higher anisotropic magnetic field $H_A$ than in SrLaCo ferrites, failing to meet both requirements of high $H_{cJ}$ and high $H_k/H_{cJ}$, so that they cannot be used in various applications such as motors, etc.

Various proposals have been made to improve the magnetic properties of CaLaCo ferrites. For example, JP 2006-104050 A proposes a CaLaCo ferrite containing La and Co at a particular ratio, in which the molar ratio of each element and n are optimized, WO 2007/060757 A proposes a CaLaCo ferrite, in which part of Ca is substituted by La and Ba, and WO 2007/077811 A proposes a CaLaCo ferrite, in which part of Ca is substituted by La and Sr.

However, the CaLaCo ferrites described in JP 2006-104050 A, WO 2007/060757 A and WO 2007/077811 A are insufficient for an increasingly stronger recent demand of higher performance, despite improved magnetic properties than those of the CaLaCo ferrite proposed by Japanese Patent 3181559. Thus, further improvement in magnetic properties is desired.

WO 2011/001831 A proposes the addition of more than 1% and 1.8% or less by mass of $SiO_2$, and 1-2% by mass (as CaO) of $CaCO_3$ as sintering aids to calcined bodies for the CaLaCo ferrites proposed by JP 2006-104050 A, WO 2007/060757 A and WO 2007/077811 A, thereby providing the CaLaCo ferrites with specifically improved $H_{cJ}$ while preventing decrease in Br and $H_k/H_{cJ}$ as much as possible.

Though the CaLaCo ferrites proposed by WO 2011/001831 A, which contains relatively large amounts of sintering aids, have specifically improved $H_{cJ}$, most of them have as low $H_k/H_{cJ}$ as less than 85% at $H_{cJ}$ exceeding 360 kA/m (about 4.5 kOe), so that they cannot be made sufficiently thin.

OBJECT OF THE INVENTION

Accordingly, an object of the present invention is to provide a sintered ferrite magnet having improved $H_{cJ}$ with high Br and high $H_k/H_{cJ}$ kept, which can be made thinner, and its production method.

SUMMARY OF THE INVENTION

As a result of intensive research in view of the above object, the inventors have found that a CaLaCo ferrite can be provided with improved $H_{cJ}$ while keeping high Br and high $H_k/H_{cJ}$, by adding 1.8% or less by mass of $SiO_2$, and 2% or less by mass (as CaO) of $CaCO_3$ as sintering aids, with a temperature-elevating speed of 1-4° C./minute in a temperature range from 1100° C. to a sintering temperature, and a temperature-lowering speed of 6° C./minute or more in a temperature range from the sintering temperature to 1100° C., during sintering.

As a result of detailed analysis on the relation between the temperature-elevating speed and the temperature-lowering speed and the structure of the ferrite, the inventors have further found that a CaLaCo ferrite has a structure in which fine grain boundary phases among three or more main phases are evenly dispersed, when sintered with a temperature-elevating speed and a temperature-lowering speed within the above ranges; while it has a structure in which relatively large grain boundary phases among three or more main phases are unevenly dispersed, when sintered with a temperature-elevating speed and a temperature-lowering speed outside the above ranges.

It has thus been found that with a temperature-elevating speed of 1-4° C./minute in a temperature range from 1100° C. to a sintering temperature, and a temperature-lowering speed of 6° C./minute or more in a temperature range from the sintering temperature to 1100° C., during sintering, the resultant ferrite has a structure in which fine grain boundary phases among three or more main phases are evenly dispersed, thereby having improved $H_{cJ}$ with high Br and high $H_k/H_{cJ}$ kept. The present invention has been completed based on such findings.

Thus, the method of the present invention for producing a sintered ferrite magnet comprising main phases of ferrite having a hexagonal M-type magnetoplumbite structure, first grain boundary phases existing between two main phases, and second grain boundary phases existing among three or more main phases; the second grain boundary phases being dispersed in an arbitrary cross section of the sintered ferrite; and the second grain boundary phases having an average area of less than 0.2 μm², comprises the steps of preparing raw material powders comprising metal elements of Ca, La, an element A which is Ba and/or Sr, Fe and Co, which are represented by the general formula of $Ca_{1-x-y}La_xA_yFe_{2n-z}Co_z$, wherein 1−x−y, x, y and z representing the atomic ratios of the metal elements, and n representing a molar ratio meet:

0.3≤1−x−y≤0.65,
0.3≤x≤0.65,
0≤y≤0.2,
0.25≤z≤0.65, and
4.5≤n≤7;

calcining the raw material powders to obtain a calcined body;
pulverizing the calcined body to obtain powder;
molding the powder to obtain a green body; and
sintering the green body to obtain a sintered body;
0-1.8% by mass of $SiO_2$ and 0-2% by mass (as CaO) of $CaCO_3$ being added to 100% by mass of the calcined body after calcining and before molding; and the sintering step being conducted with a temperature-elevating speed of 1-4° C./minute in a temperature range from 1100° C. to a sintering temperature, and a temperature-lowering speed of 6° C./minute or more in a temperature range from the sintering temperature to 1100° C.

The amount of $SiO_2$ added is preferably 1-1.8% by mass, and the amount (as CaO) of $CaCO_3$ added is preferably 1-2% by mass.

The amount of $SiO_2$ added is preferably 1.1-1.6% by mass, and the amount (as CaO) of $CaCO_3$ added is preferably 1.2-2% by mass.

900 or more second grain boundary phases preferably exist in a region of 53×53 μm² in an arbitrary cross section of the sintered ferrite magnet.

The sintered ferrite magnet of the present invention comprises main phases of ferrite having a hexagonal M-type magnetoplumbite structure, first grain boundary phases existing between two main phases, and second grain boundary phases existing among three or more main phases; the second grain boundary phases being dispersed in an arbitrary cross section of the sintered ferrite magnet; and the second grain boundary phases having an average area of less than 0.2 μm².

The sintered ferrite magnet preferably comprises metal elements of Ca, La, an element A which is Ba and/or Sr, Fe and Co, and 0-1.8% by mass of $SiO_2$, a composition of the metal elements being represented by the general formula of $Ca_{1-x-y}La_xA_yFe_{2n-z}Co_z$, wherein 1−x−y, x, y and z representing the atomic ratios of the metal elements, and n representing a molar ratio meet:

0.3≤1−x−y≤0.75,
0.2≤x≤0.65,
0≤y≤0.2,
0.25≤z≤0.65, and
3≤n≤6.

900 or more second grain boundary phases preferably exist in a region of 53×53 μm² in an arbitrary cross section of the sintered ferrite magnet.

DESCRIPTION OF THE PREFERRED EMBODIMENTS

Figure 1:
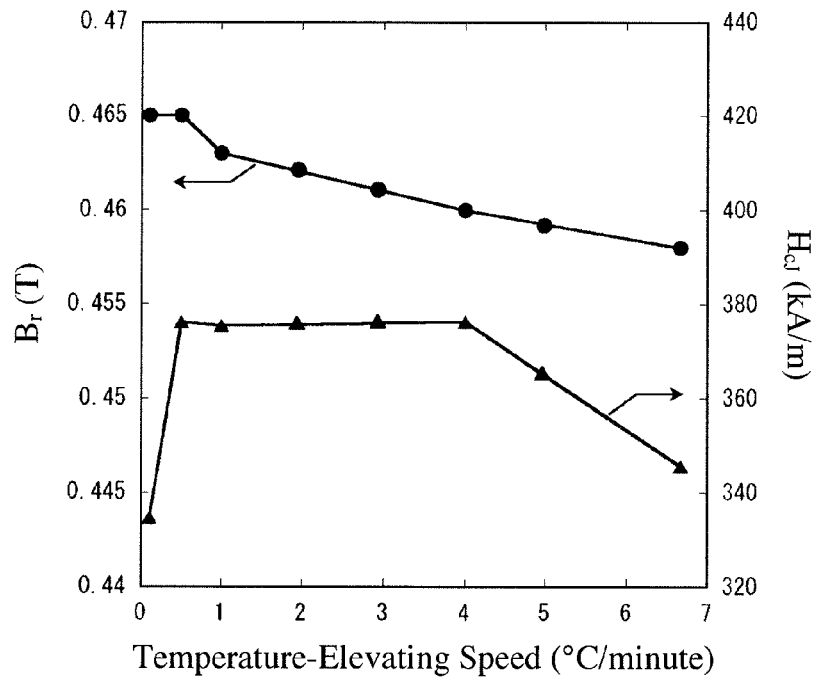
FIG. 1 is a graph showing the relation between a temperature-elevating speed in the sintering step and Br and $H_{cJ}$ in the sintered ferrite magnet of Sample 1 in Example 1.

[1] Production Method of Sintered Ferrite Magnet

The method of the present invention for producing a sintered ferrite magnet comprising main phases of ferrite having a hexagonal M-type magnetoplumbite structure, first grain boundary phases existing between two main phases, and second grain boundary phases existing among three or more main phases; the second grain boundary phases being dispersed in an arbitrary cross section of the sintered ferrite magnet; and the second grain boundary phases having an average area of less than 0.2 $\mu m^2$, comprises the steps of preparing raw material powders comprising metal elements of Ca, La, an element A which is Ba and/or Sr, Fe and Co, which are represented by the general formula of $Ca_{1-x-y}La_xA_yFe_{2n-z}Co_z$, wherein 1−x−y, x, y and z representing the atomic ratios of the sintered ferrite magnet, and n representing a molar ratio meet:

0.3≤1−x−y≤0.65,
0.3≤x≤0.65,
0≤y≤0.2,
0.25≤z≤0.65, and
4.5≤n≤7;

calcining the raw material powders to obtain a calcined body;
pulverizing the calcined body to obtain powder;
molding the powder to obtain a green body; and
sintering the green body to obtain a sintered body;
0-1.8% by mass of $SiO_2$ and 0-2% by mass (as CaO) of $CaCO_3$ being added to 100% by mass of the calcined body, after calcining and before molding; and
the sintering step being conducted with a temperature-elevating speed of 1-4° C./minute in a temperature range from 1100° C. to a sintering temperature, and a temperature-lowering speed of 6° C./minute or more in a temperature range from the sintering temperature to 1100° C.

Each step in this method and the sintered ferrite magnet produced by this method will be explained below.

(a) Preparing Step of Raw Material Powders

Raw material powders having a composition comprising metal elements of Ca, La, an element A which is Ba and/or Sr, Fe and Co, which is represented by the general formula of $Ca_{1-x-y}La_xA_yFe_{2n-z}Co_z$, wherein 1−x−y, x, y and z representing the atomic ratios of the sintered ferrite magnet, and n representing a molar ratio meet:

0.3≤1−x−y≤0.65,
0.3≤x≤0.65,
0≤y≤0.2,
0.25≤z≤0.65, and
4.5≤n≤7, are prepared.

Reasons for limiting the composition ranges of elements and their preferred ones in the sintered ferrite magnet described below will be explained below.

"1−x−y" representing the Ca content meets 0.3≤1−x−y≤0.65. Less than 0.3 of Ca undesirably reduces Br and $H_k/H_{cJ}$. Ca exceeding 0.65 makes the amounts of La and the element A relatively small, undesirably resulting in low Br and $H_k/H_{cJ}$. When 2% or less by mass (as CaO) of $CaCO_3$ is added as a sintering aid to 100% by mass of the calcined body, a sintered ferrite magnet has a higher Ca content than in the calcined body. As a result, the Ca content (1−x−y) in the sintered ferrite magnet is 0.3≤1−x−y≤0.75.

The La content (x) is 0.3≤x≤0.65. Less than 0.3 or more than 0.65 of La undesirably lowers Br and $H_k/H_{cJ}$. Part of La may be substituted by at least one of rare earth elements excluding La. The amount of a substituting element is preferably 50 mole % or less of La. When 2% or less by mass (as CaO) of $CaCO_3$ is added as a sintering aid to 100% by mass of the calcined body, a sintered ferrite magnet has a higher Ca content than in the calcined body, and thus a lower La content. Accordingly, the La content (x) in the sintered ferrite magnet is 0.2≤x≤0.65.

The element A is Ba and/or Sr. The element A content (y) is 0≤y≤0.2. Though the effects of the present invention are obtained without the element A, crystals in the calcined body become finer and have smaller aspect ratios by the addition of the element A, resulting in improved $H_{cJ}$. More than 0.2 of the element A undesirably provides sintered ferrite magnets closer to SrLaCo ferrites, resulting in difficulty to obtain a structure in which fine grain boundary phases among three or more main phases are evenly dispersed. Though $CaCO_3$ added before pulverization likely makes the element A content smaller in the sintered ferrite magnet, the element A content in the sintered magnet is in the same range as in the calcined body, because of little change from its originally low content.

The Co content (z) is 0.25≤z≤0.65. Less than 0.25 of Co fails to improve magnetic properties. Also, because unreacted $\alpha$-$Fe_2O_3$ remains in the calcined body, a slurry leaks from a mold cavity in wet molding. More than 0.65 of Co undesirably forms Co-rich foreign phases, resulting in drastically lowered magnetic properties.

Part of Co may be substituted by at least one of Zn, Ni and Mn. Particularly, the substitution of part of Co by Ni and Mn reduces a production cost without lowering magnetic properties. Also, the substitution of part of Co by Zn can improve Br, despite slightly lowered $H_{cJ}$. The total amount of substituting Zn, Ni and Mn is preferably 50% or less by mole of Co.

"n" represents a molar ratio of (Fe+Co) to (Ca+La+A), meeting 2n=(Fe+Co)/(Ca+La+A). The molar ratio n is preferably 4.5≤n≤7. Less than 4.5 of n increases the ratio of non-magnetic portions, and makes calcined particles excessively flat, thereby drastically reducing $H_{cJ}$. When n is more than 7, unreacted $\alpha$-$Fe_2O_3$ undesirably remains in the calcined body, resulting in the leak of a slurry from a mold cavity in wet molding. When 2% or less by mass (as CaO) of $CaCO_3$ is added to 100% by mass of the calcined body before pulverization, a sintered ferrite magnet has a higher Ca content than in the calcined body, resulting in smaller n. Accordingly, the molar ratio n in the sintered ferrite magnet is 3≤n≤6.

A molar ratio x/z of La to Co is preferably 1≤x/z≤3, more preferably 1.2≤x/z≤2. The selection of a composition meeting these values improves magnetic properties.

In the present invention, when La content>Co content>element A content, namely, x>z>y, the magnetic properties are largely improved.

Though the above composition is expressed by the atomic ratios of metal elements, a composition including oxygen (O) is represented by the general formula of $Ca_{1-x-y}La_xA_yFe_{2n-z}Co_zO_\alpha$, wherein 1−x−y, x, y, z and $\alpha$, and n representing a molar ratio meet:

$0.3 \leq 1-x-y \leq 0.65$,
$0.3 \leq x \leq 0.65$,
$0 \leq y \leq 0.2$,
$0.25 \leq z \leq 0.65$, and
$4.5 \leq n \leq 7$,
La and Fe being trivalent, Co being divalent, and $\alpha=19$ at a stoichiometric composition ratio at which $x=z$, and $n=6$.

In the composition including oxygen (O) of a calcined ferrite, the molar number of oxygen differs depending on the valences of Fe and Co, and the value of n. Because a ratio of oxygen to metal elements in a sintered ferrite magnet differs depending on the vacance of oxygen when sintered in a reducing atmosphere, the valences of Fe and Co in a ferrite phase, etc., an actual molar number $\alpha$ of oxygen may deviate from 19. Accordingly, the composition is most easily expressed by the atomic ratios of metal elements in the present invention.

Oxides, carbonates, hydroxides, nitrates, chlorides, etc. of metals may be used for the raw material powders regardless of their valences. A solution of the raw material powders may also be used. Ca compounds include carbonates, oxides, chlorides, etc. of Ca. La compounds include oxides such as $La_2O_3$, hydroxides such as $La(OH)_3$, carbonates such as $La_2(CO_3)_3.8H_2O$, etc. Element A compounds include carbonates, oxides, chlorides, etc. of Ba and/or Sr. Iron compounds include iron oxide, iron hydroxide, iron chloride, mill scale, etc. Co compounds include oxides such as CoO, $Co_3O_4$, hydroxides such as CoOOH, $Co(OH)_2$, $Co_3O_4.m_1H_2O$, wherein $m_1$ is a positive number, carbonates such as $CoCO_3$, and basic carbonates such as $m_2CoCO_3.m_3Co(OH)_2.m_4H_2O$, etc., wherein $m_2$, $m_3$ and $m_4$ are positive numbers.

Other raw material powders than $CaCO_3$, $Fe_2O_3$ and $La_2O_3$ may be added when raw materials are mixed, or after calcining. For example, (1) $CaCO_3$, $Fe_2O_3$, $La_2O_3$ and $Co_3O_4$ may be mixed and calcined to form a calcined body, which is pulverized, molded and sintered to provide a sintered ferrite magnet; (2) $CaCO_3$, $Fe_2O_3$ and $La_2O_3$ may be mixed and calcined to form a calcined body, to which $Co_3O_4$ is added, and the calcined body may be pulverized, molded and sintered to provide a sintered ferrite magnet.

To accelerate a calcining reaction, up to about 1% by mass of B compounds such as $B_2O_3$, $H_3BO_3$, etc. may be added, if necessary. Particularly, the addition of $H_3BO_3$ is effective to improve $H_{cJ}$ and Br. The amount of $H_3BO_3$ added is more preferably 0.3% or less by mass, most preferably about 0.2% by mass. Less than 0.1% by mass of $H_3BO_3$ has a small effect of improving Br, and more than 0.3% by mass of $H_3BO_3$ lowers Br. Because $H_3BO_3$ controls the shapes and sizes of crystal grains during sintering, it may be added after calcining (before fine pulverization and before sintering), or both before and after calcining.

The raw material powders may be mixed in any of wet and dry manners. Stirring with media such as steel balls enables more uniform mixing of raw material powders. In wet mixing, water is preferably used as a solvent. To increase the dispersibility of raw material powders, known dispersants such as ammonium polycarboxylate, calcium gluconate, etc. may be used. The mixed raw material slurry is dewatered to provide a raw material powder mixture.

(b) Calcining Step

The raw material powder mixture is heated in an electric furnace, a gas furnace, etc., to form a ferrite compound having a hexagonal M-type magnetoplumbite structure by a solid-phase reaction. This process is called "calcining," and the resultant compound is called "calcined body."

The calcining step is conducted preferably in an atmosphere having an oxygen concentration of 5% or more. At an oxygen concentration of less than 5%, abnormal grain growth, the formation of foreign phases, etc. occur. The more preferred oxygen concentration is 20% or more.

In the calcining step, a solid-phase reaction forming a ferrite phase proceeds more as the temperature is elevated, and completed at about 1100° C. At a calcining temperature of lower than 1100° C., unreacted hematite (iron oxide) remains, resulting in low magnetic properties. At a calcining temperature exceeding 1450° C., crystal grains excessively grow, needing too much time for pulverization. Accordingly, the calcining temperature is preferably 1100-1450° C., more preferably 1200-1350° C. The calcining time is preferably 0.5-5 hours.

When $H_3BO_3$ is added before calcining, a ferritization reaction is accelerated, so that calcining can be conducted at 1100-1300° C.

(c) Addition of Sintering Aid

After calcining and before molding described below, 0-1.8% by mass of $SiO_2$, and 0-2% by mass (as CaO) of $CaCO_3$ are preferably added as sintering aids to 100% by mass of the calcined body. The sintering aids may be added to the calcined body, followed by a pulverization step; or the sintering aids may be added to the pulverized calcined body, followed by a molding step.

More than 1.8% by mass of $SiO_2$ undesirably lowers $H_{cJ}$, as well as Br and $H_k/H_{cJ}$. To improve $H_{cJ}$, the amount of $SiO_2$ added is more preferably 1-1.8% by mass, most preferably 1.1-1.6% by mass. Though $SiO_2$ is most preferably added to the calcined body, part of it may be added before calcining (when the raw material powders are mixed). With $SiO_2$ added before calcining, the sizes of crystal grains can be controlled during calcining.

2% or less by mass (as CaO) of $CaCO_3$ is added to 100% by mass of the calcined body. The addition of $CaCO_3$ improves $H_{cJ}$. More than 2% by mass of $CaCO_3$ added undesirably reduces $B_r$ and $H_k/H_{cJ}$. The amount of $CaCO_3$ added is more preferably 1-2% by mass, further preferably 1.2-2% by mass. With a preferred amount of $CaCO_3$ added, as extremely high $H_{cJ}$ as more than 500 kA/m (about 6.3 kOe) can be obtained. In the present invention, the amount of $CaCO_3$ added is expressed by an amount as CaO. The amount of $CaCO_3$ added can be determined from the amount as CaO by the equation:

(Molecular weight of $CaCO_3$×amount as CaO)/molecular weight of CaO.

For example, when 1.5% by mass as CaO of $CaCO_3$ is added, the amount of $CaCO_3$ added is [40.08 (atomic weight of Ca)+12.01 (atomic weight of C)+48.00 (atomic weight of O×3)=100.09 (molecular weight of $CaCO_3$)]×1.5% by mass (amount as CaO)/[40.08 (atomic weight of Ca)+16.00 (atomic weight of O)=56.08 (molecular weight of CaO)]= 2.677% by mass.

By limiting a ratio of $CaCO_3$ to $SiO_2$ [amount of $CaCO_3$ (as CaO)/amount of $SiO_2$] to 0.8-2, the magnetic properties can be further improved.

Because the CaLaCo ferrite of the present invention contains Ca as a main phase component, a liquid phase is formed without adding $SiO_2$ and $CaCO_3$ as sintering aids, enabling sintering. Without adding $SiO_2$ and $CaCO_3$ mainly forming grain boundary phases in the sintered ferrite magnet, grain boundary phases are formed. Though the present invention can be performed without adding $SiO_2$ and $CaCO_3$, the absence of these compounds makes it difficult to obtain a later-described structure in which fine grain boundary phases existing among three or more main phases are evenly dispersed, resulting in low $H_{cJ}$. Accordingly, to prevent decrease in $H_{cJ}$, $SiO_2$ and/or $CaCO_3$ is preferably added.

In addition to $SiO_2$ and $CaCO_3$, $Cr_2O_3$, $Al_2O_3$, etc. may be added after calcining and before molding described below, to improve magnetic properties. The amounts of these compounds are preferably 5% or less by mass each.

(d) Pulverization Step

The calcined body is pulverized by a vibration mill, a ball mill, an attritor, etc. to provide a pulverized powder. The pulverized powder preferably has an average particle size of about 0.4-0.8 μm (measured by an air permeation method). In the pulverization step, either dry pulverization or wet pulverization may be conducted, though both are preferably combined.

Wet pulverization is conducted using water and/or a non-aqueous solvent (an organic solvent such as acetone, ethanol, xylene, etc.). The wet pulverization prepares a slurry of the calcined powder in water (a solvent). 0.2-2% by mass, as a solid component ratio, of known dispersant and/or surfactant are preferably added to the slurry. After the wet pulverization, the slurry is preferably concentrated and blended.

Because the pulverized powder contains ultrafine powder of less than 0.1 μm deteriorating dewaterability and moldability, the pulverized powder is preferably heat-treated to remove the ultrafine powder. The heat-treated powder is preferably repulverized. Thus, using a pulverization step comprising a first fine pulverization step, and a second fine pulverization step of heat-treating powder obtained by the first fine pulverization step, and then repulverizing the heat-treated powder (hereinafter referring to as "heat-treating and repulverizing step"), $H_{cJ}$ can be improved.

A usual pulverization step inevitably generates ultrafine powder of less than 0.1 μm, thereby deteriorating $H_{cJ}$ and dewaterability in a molding step, forming defective green bodies, and taking a lot of time for dewatering, which leads to a longer pressing cycle. When ultrafine-powder-containing powder obtained by the first fine pulverization step is heat-treated, a reaction occurs between relatively large powder and ultrafine powder, thereby reducing the amount of ultrafine powder. The second fine pulverization step controls particle sizes and removes necking, providing powder with a predetermined particle size. Thus obtained is powder containing a small amount of ultrafine powder, thereby having an excellent particle size distribution and improved $H_{cJ}$, thereby solving the above problems in a molding step.

Utilizing the effect of the heat-treating and repulverizing step to improve $H_{cJ}$, powder obtained through the second fine pulverization step to have a relatively large particle size, for example, an average particle size of about 0.8-1.0 μm (measured by an air permeation method), has $H_{cJ}$ on the same level as that of powder obtained by a usual pulverization step, which has an average particle size of about 0.4-0.8 μm (measured by an air permeation method). Accordingly, the second fine pulverization step can be conducted in a shorter period of time, thereby resulting in further improved dewaterability and a shorter pressing cycle.

Though the heat-treating and repulverizing step provides various effects, cost increase is unavoidable by increase in the number of production steps. However, because the heat-treating and repulverizing step provides much improved magnetic properties than those of conventional sintered ferrite magnets, the cost increase can be offset. Accordingly, the heat-treating and repulverizing step is a practically significant step in the present invention.

The first fine pulverization, which is the same as the above-described usual pulverization, is conducted by a vibration mill, a jet mill, a ball mill, an attritor, etc. The pulverized powder preferably has an average particle size of about 0.4-0.8 μm (measured by an air permeation method). The pulverization step may be conducted in either dry or wet manner, though both are preferably combined.

The heat treatment after the first fine pulverization step is conducted preferably at 600-1200° C., more preferably at 800-1100° C. Though not restrictive, the heat treatment time is preferably 1 second to 100 hours, more preferably about 1-10 hours.

The second fine pulverization after the heat treatment step is conducted by a vibration mill, a jet mill, a ball mill, an attritor, etc., as in the first fine pulverization. Because desired particle sizes are substantially obtained in the first fine pulverization step, the second fine pulverization step mainly controls particle sizes and removes necking. Accordingly, the second fine pulverization step is preferably conducted under milder pulverization conditions such as shorter pulverization time than in the first fine pulverization step. As hard conditions as in the first fine pulverization step are not desirable because ultrafine powder is formed again.

To provide higher $H_{cJ}$ than in sintered ferrite magnets obtained through a usual pulverization step, the powder after the second fine pulverization preferably has an average particle size of about 0.4-0.8 μm (measured by an air permeation method), like a usual pulverization step. For shorter pulverization time, improved dewaterability, a shorter pressing cycle, etc., the average particle size is 0.8-1.2 μm, preferably about 0.8-1.0 μm (measured by an air permeation method).

(e) Molding Step

The pulverized slurry is pressed with or without a magnetic field, while removing water (a solvent). Pressing in a magnetic field can align the crystal orientations of powder particles, thereby drastically improving magnetic properties. Further, a dispersant and a lubricant may be added in an amount of 0.01-1% by mass each to improve orientation. Before molding, the slurry may be concentrated, if necessary. The concentration is preferably conducted by centrifugal separation, filter pressing, etc.

(f) Sintering Step

The green body obtained by pressing is degreased, if necessary, and then sintered to obtain a sintered body (sintered magnet). The method of the present invention is characterized in that a temperature-elevating speed is 1-4° C./minute in a temperature range from 1100° C. to a sintering temperature, and a temperature-lowering speed is 6° C./minute or more in a temperature range from the sintering temperature to 1100° C., in the sintering step.

With a temperature-elevating speed of 1-4° C./minute in a temperature range from 1100° C. to a sintering temperature, and a temperature-lowering speed of 6° C./minute or more in a temperature range from the sintering temperature to 1100° C. in the sintering step, a sintered ferrite magnet having a structure comprising main phases of ferrite having a hexagonal M-type magnetoplumbite structure, first grain boundary phases existing between two main phases, and second grain boundary phases existing among three or more main phases can be produced, the second grain boundary phases being dispersed in an arbitrary cross section of the sintered ferrite magnet; and the second grain boundary phases having an average area of less than 0.2 μm², thereby having improved $H_{cJ}$ with high Br and high $H_k/H_{cJ}$ kept, so that the sintered ferrite magnet can be made thin.

Though a temperature-elevating speed of less than 1° C./minute, for example, 0.5° C./minute can improve $H_{cJ}$ while keeping high Br and high $H_k/H_{cJ}$, too low a temperature-elevating speed undesirably provides a long production cycle and thus a high production cost. When the temperature-elevating speed exceeds 4° C./minute, the second grain boundary phases having an average area of 0.2 µm² or more are unevenly dispersed in an arbitrary cross section of the sintered ferrite magnet, resulting in low $H_{cJ}$. Accordingly, the temperature-elevating speed is preferably 1-4° C./minute, more preferably 1-2° C./minute.

With a temperature-lowering speed of less than 6° C./minute, the second grain boundary phases having an average area of 0.2 µm² or more are unevenly dispersed in an arbitrary cross section of the sintered ferrite magnet, resulting in low $H_{cJ}$. On the other hand, because the temperature-lowering speed of 6° C./minute or more can improve $H_{cJ}$ while keeping high Br and high $H_k/H_{cJ}$, the upper limit of the temperature-lowering speed is not particularly restricted. However, too high a temperature-lowering speed likely causes cracking in the sintered body. Also, because rapid temperature decrease needs a cooling means and a blowing means in a sintering furnace, likely resulting in production cost increase. Taking these points into consideration, the upper limit of the temperature-lowering speed is preferably about 10° C./minute.

A temperature range, in which the temperature-elevating speed is 1-4° C./minute, is 1100° C. to the sintering temperature. If the temperature-elevating speed exceeded 4° C./minute even temporarily in a temperature range of 1100° C. or higher, unevenly dispersed second grain boundary phases would unlikely have an average area of less than 0.2 µm², resulting in low $H_{cJ}$. As long as the temperature-elevating speed is 1-4° C./minute in a temperature range from 1100° C. to the sintering temperature, the temperature-elevating speed is not particularly restricted in other temperature ranges.

A temperature range, in which the temperature-lowering speed is 6° C./minute or more, is the sintering temperature to 1100° C. If the temperature-lowering speed were less than 6° C./minute even temporarily in a 1100° C. or higher, unevenly dispersed second grain boundary phases would unlikely have an average area of less than 0.2 µm², resulting in low $H_{cJ}$. As long as the temperature-lowering speed is 6° C./minute or more in a temperature range from the sintering temperature to 1100° C., the temperature-lowering speed is not particularly restricted in other temperature ranges.

Sintering is conducted in an electric furnace, a gas furnace, etc. The sintering is preferably conducted in an atmosphere having an oxygen concentration of 10% or more. Less than 10% of the oxygen concentration causes abnormal grain growth, the formation of foreign phases, etc., thereby deteriorating magnetic properties. The oxygen concentration is more preferably 20% or more, most preferably 100%. The sintering temperature is preferably 1150-1250° C., and the sintering time is preferably 0.5-2 hours. The sintered magnet obtained by the sintered step has an average crystal grain size of about 0.5-2 µm.

The sintered ferrite magnet is subjected to known production steps such as machining, cleaning, inspection, etc.

As described above, the present invention is characterized in that in the sintering step, a temperature-elevating speed in a range from 1100° C. to the sintering temperature is as low as 1-4° C./minute, and a temperature-lowering speed in a range from the sintering temperature to 1100° C. is 6° C./minute or more, higher than the temperature-elevating speed, thereby improving $H_{cJ}$ while keeping high Br and high $H_k/H_{cJ}$. Reasons for this feature, which have been conceived by the inventors based on now available knowledge, will be explained below, without intention of restricting the scope of the present invention.

Sintered ferrite magnets including the sintered ferrite magnet of the present invention are generally obtained by a liquid-phase sintering process. In the present invention, $SiO_2$ and $CaCO_3$ if added as sintering aids constitute part of a liquid phase, and Ca contained as a main phase component constitutes part of a liquid phase if the sintering aids are not added. After sintering, the liquid phase forms the first grain boundary phases between two main phases, and second grain boundary phases among three or more main phases.

In the present invention, slow temperature elevation at a speed of 1-4° C./minute in a temperature range from 1100° C. to the sintering temperature accelerates solid phases to be dissolved and precipitated in liquid phases, resulting in an optimum structure, in which the second grain boundary phases having an average area of less than 0.2 µm² are dispersed.

However, if the temperature were slowly lowered after sintering, in a temperature range from 1100° C. to the sintering temperature as in the temperature elevation, the solid phases would be dissovled and precipitated in the liquid phases again, losing the optimum structure. Thus, the temperature is rapidly lowered at a speed of 6° C./minute or more in a temperature range from the sintering temperature to 1100° C., thereby keeping a structure in which the second grain boundary phases having an average area of less than 0.2 µm² are dispersed. As a result, $H_{cJ}$ can be improved while keeping high $B_r$ and high $H_k/H_{cJ}$.

The dissolving and precipitation of solid phases in liquid phases in the sintering step occurs not only in the CaLaCo ferrite of the present invention, but also in SrLaCo ferrites, though their mechanisms are largely different in the following respects.

In the CaLaCo ferrite, $SiO_2$ and $CaCO_3$ if added as sintering aids constitute part of liquid phases, and Ca contained as a main phase component constitutes part of liquid phases if the sintering aids are not added, as described above. Namely, Ca are contained in both of the main phases and the liquid phases. In the dissolving and precipitation of the solid phases to the liquid phases in the sintering step, Ca in the main phases and Ca in the liquid phases are presumably mutually diffused. Namely, the mutual diffusion of Ca between the main phases and the liquid phases accelerates the dissolving and precipitation of the solid phases in the liquid phases, resulting in a structure, in which the second grain boundary phases having an average area of less than 0.2 µm² are dispersed.

On the other hand, because SrLaCo ferrites basically do not contain Ca in main phases, $SiO_2$ and $CaCO_3$ added as sintering aids mainly constitute liquid phases. Using an FE-TEM having functions as a scanning transmission electron microscope (STEM) and an energy-dispersive X-ray spectroscope (EDS), the inventors have analyzed the compositions of three arbitrary grain boundary phases in a sintered SrLaCo ferrite magnet [$Sr_{1-x}La_xFe_{11.6-y}Co_y$, containing 1.2% by mass of $SiO_2$ and 1.5% by mass (as CaO) of $CaCO_3$ as sintering aids], obtaining the results shown in Table 1, in which the content of each element is expressed by atomic %.

TABLE 1

| Metal Element | Grain Boundary Phases 1 | Grain Boundary Phases 2 | Grain Boundary Phases 3 |
|---|---|---|---|
| Ca | 35.3 | 36.6 | 35.0 |
| Si | 38.2 | 39.8 | 42.6 |
| Sr | 10.8 | 10.4 | 9.3 |
| La | 1.63 | 1.52 | 1.29 |
| Fe | 14.1 | 11.7 | 11.8 |

As shown in Table 1, grain boundary phases in the sintered SrLaCo ferrite magnet contain Sr, La and Fe, in addition to Si and Ca added as sintering aids. This result indicates that when solid phases are dissolved and precipitated in liquid phases in the SrLaCo ferrite, main phases are dissolved, permitting main phase components to diffuse to the liquid phases.

With respect to the stability of ferrite phases having a hexagonal M-type magnetoplumbite structure, it is known that Sr ferrite>SrLaCo ferrite>CaLaCo ferrite. Because ferrite phases in the CaLaCo ferrite are more unstable than those in the Sr ferrite and the SrLaCo ferrite as described above, Ca contained in main phases and Ca contained in liquid phases are mutually diffused in the CaLaCo ferrite. Accordingly, in the SrLaCo ferrite having stable ferrite phases, even if main phases are dissolved to permit main phase components to diffuse to liquid phases, liquid phase components would not diffuse to main phases. Namely, it does not appear probable that stable SrLaCo ferrite phases become unstable by receiving Ca. It is thus considered that while solid phases are dissolved and precipitated in liquid phases in the SrLaCo ferrite, there is no mutual diffusion between the main phases and the liquid phases, so that Sr and La migrate in a one-way manner from the main phases to the liquid phases. With Sr and La in main phases dissolved in liquid phases, namely, with Sr and La eluting from R block shell layers of main phases, only spinel block layers remain, resulting in low crystal magnetic anisotropy near main phase boundaries, and thus providing the sintered magnet with low $H_{cJ}$. Also, when main phases are dissolved, the ratio of main phases to the entire sintered magnet decreases, resulting in low $B_r$.

As shown in Examples below, in the sintered ferrite magnet of the present invention, too, main phase components migrate toward grain boundary phases (liquid phases). However, because Ca is contained in both main phases and liquid phases in the CaLaCo ferrite as described above, the dissolving and precipitation of solid phases in liquid phases are accelerated by the mutual diffusion of Ca between the main phases and liquid phases, without suffering decrease in $H_{cJ}$ and $B_r$. Rather, the structure of the CaLaCo ferrite is optimized, improving $H_{cJ}$ while keeping high $B_r$ and high $H_k/H_{cJ}$.

It is thus considered that when solid phases are dissolved and precipitated in liquid phases, different phenomena occur in the CaLaCo ferrite and the SrLaCo ferrite. Accordingly, such a structure as in the present invention, in which second grain boundary phases having an average area of less than 0.2 μm² are dispersed in an arbitrary cross section, is not formed in the SrLaCo ferrite. Such a structure is peculiar to or remarkably appears in the CaLaCo ferrite.

Why different phenomena occur is clear from the descriptions of prior art references describing temperature-elevating speeds and temperature-lowering speeds in SrLaCo ferrites.

JP 2001-223104 A describes that a temperature-elevating speed of 1-5° C./minute (a temperature-lowering speed of 1-20° C./minute in the specification and 5° C./minute in Examples) improves $H_{cJ}$. This phenomenon that as long as a temperature-elevating speed is 1-5° C./minute, improved $H_{cJ}$ would be obtained even if a temperature-lowering speed were not be controlled, differs from that of CaLaCo ferrite. Because part of raw materials are also added after calcining (so-called "post-addition") in JP 2001-223104 A, it is not clear whether the improvement of $H_{cJ}$ is achieved by the temperature-elevating speed alone, or by the post-addition.

JP 2000-277312 A describes that when both temperature-elevating speed and temperature-lowering speed are 1-4° C./minute at 900° C. or higher, $H_{cJ}$ is improved. A phenomenon that improved $H_{cJ}$ is obtained when a temperature-elevating speed and a temperature-lowering speed are as low as 1-4° C./minute differs from that of CaLaCo ferrite. Because $Al_2O_3$ is indispensably contained in this reference, it is not clear whether the improvement of $H_{cJ}$ is achieved by the temperature-elevating speed and the temperature-lowering speed, or by $Al_2O_3$ contained.

JP 2003-297623 A describes that in the SrLaCo ferrite, $H_{cJ}$ is improved by a temperature-lowering speed of more than 5° C./minute during sintering, but it fails to describe a temperature-elevating speed, which appears to be 5° C./minute from the figures. This phenomenon that $H_{cJ}$ is improved by setting a temperature-lowering speed more than 5° C./minute differs from that of the CaLaCo ferrite.

[2] Sintered Ferrite Magnet

The sintered ferrite magnet of the present invention comprises main phases of ferrite having a hexagonal M-type magnetoplumbite structure, first grain boundary phases existing between two main phases, and second grain boundary phases existing among three or more main phases; the second grain boundary phases being dispersed in its arbitrary cross section; and the second grain boundary phases having an average area of less than 0.2 μm².

Main phases in the sintered ferrite magnet of the present invention are ferrite phases having a hexagonal M-type magnetoplumbite structure. In general, a magnetic material, particularly a sintered magnet, is composed of pluralities of compounds, among which a compound determining the properties of the magnetic material (physical and magnetic properties, etc.) is defined as a "main phase." The main phases in the present invention, namely, ferrite phases having a hexagonal M-type magnetoplumbite structure, determine the basic physical and magnetic properties of the sintered ferrite magnet of the present invention.

The term "having a hexagonal M-type magnetoplumbite structure" means that a hexagonal M-type magnetoplumbite structure is mainly observed in an X-ray diffraction pattern of the sintered ferrite measured under a general condition.

The sintered ferrite magnet of the present invention contains, in addition to the main phases, first grain boundary phases existing between two main phases, and second grain boundary phases existing among three or more main phases. The first grain boundary phases existing between two main phases are called two-particle grain boundary phases by those skilled in the art, which are observed as linear grain boundary phases existing between main phases in an arbitrary cross section of the sintered ferrite magnet. The second grain boundary phases existing among three or more main phases are called "triplet-junction grain boundary phases" by those skilled in the art, which are observed as those having substantially triangular, polygonal or irregular shapes in an arbitrary cross section of the sintered ferrite magnet. Because the first grain boundary phases are too thin to observe by X-ray diffraction, a high-resolution transmission electron microscope, etc. are preferably used. When both first and second grain boundary phases are expressed as a whole in the following explanations, they may be simply called "grain boundary phases."

The second grain boundary phases are dispersed in an arbitrary cross section of the sintered ferrite magnet. It is extremely rare that the second grain boundary phases are connected or segregated in particular regions (unevenly dispersed). A structure comprising segregated second grain boundary phases has reduced $H_{cJ}$.

In the sintered ferrite magnet of the present invention, individual second grain boundary phases have an average area of less than 0.2 μm². As shown in Examples below, the average area of 0.2 μm² or more provides low $H_{cJ}$. The average area of the second grain boundary phases is determined by binarizing a backscattered electron image (BSE image) of a cross section of the sintered ferrite magnet measured by a field emission-type scanning electron microscope (FE-SEM) to determine the area and number of the second grain boundary phases, and dividing their total area by their number. For example, when the second grain boundary phases are segregated, an average area in portions having few second grain boundary phases may be less than 0.2 μm². In such a case, average areas are preferably determined in different arbitrary cross sections, and averaged.

With fine second grain boundary phases having an average area of less than 0.2 μm² dispersed, $H_{cJ}$ can be improved while keeping high $B_r$ and high $H_k/H_{cJ}$.

In a preferred embodiment, 900 or more second grain boundary phases exist in a region of 53×53 μm² in an arbitrary cross section of the sintered ferrite magnet. When the number of the second grain boundary phases is less than 900, their average area is highly likely 0.2 μm² or more, undesirably resulting in a structure in which the second grain boundary phases are unevenly dispersed.

Because the sintered ferrite magnet of the present invention contains Ca as a main phase component as described above, liquid phases are formed without adding $SiO_2$ and $CaCO_3$ as sintering aids, so that it can be sintered. In this case, the resultant grain boundary phases mainly contain Ca. When 1.8% or less by mass of $SiO_2$ and 2% or less by mass (as CaO) of $CaCO_3$ are added to 100% by mass of the calcined body, $SiO_2$ and $CaCO_3$ mainly form grain boundary phases, so that the grain boundary phases indispensably contain Si and Ca.

The sintered ferrite magnet of the present invention may contain third phases containing a higher atomic ratio of La than in the main phases, in addition to the main phases and the grain boundary phases. The term "third phases" means phases different from the main phases (first phases) and the grain boundary phases (second phases), but does not define their ratio, the order of precipitation, etc. The third phases are not indispensable in the present invention, meaning that the presence or absence of the third phases does not change the construction and effects of the present invention. The sintered ferrite magnet of the present invention may contain foreign phases (spinel phase, etc.) and impurity phases observed in trace amounts (about 5% or less by mass) by X-ray diffraction, etc. The quantitative determination of foreign phases by X-ray diffraction can be conducted by such a method as Rietveld analysis.

The sintered ferrite magnet of the present invention preferably comprises metal elements of Ca, La, an element A which is Ba and/or Sr, Fe and Co, and 0-1.8% by mass of $SiO_2$, a composition of the metal elements being represented by the general formula of $Ca_{1-x-y}La_xA_yFe_{2n-z}Co_z$, wherein 1−x−y, x, y and z representing the atomic ratios of the metal elements, and n representing a molar ratio meet:

$0.3 \leq 1-x-y \leq 0.75$,
$0.2 \leq x \leq 0.65$,
$0 \leq y \leq 0.2$,
$0.25 \leq z \leq 0.65$, and
$3 \leq n \leq 6$.

With elements outside the above composition ranges, at least one of $B_r$, $H_{cJ}$ and $H_k/H_{cJ}$ undesirably decreases. Reasons for limiting the composition ranges of the elements are as described above.

The present invention will be explained in further detail by Examples below, without intention of restricting the present invention thereto.

Example 1

$CaCO_3$ powder, $La(OH)_3$ powder, $Fe_2O_3$ powder and $Co_3O_4$ powder were mixed to prepare raw material powders having a composition represented by the formula of $Ca_{1-x-y}La_xA_yFe_{2n-z}Co_z$, wherein x=0.5, y=0, z=0.3 and n=5.2, blended for 4 hours by a wet ball mill, and dried to granules, which were then calcined at 1300° C. for 3 hours in the air. The resultant calcined body was coarsely pulverized by a hammer mill to obtain coarse powder.

0.6% by mass of $SiO_2$ and 0.7% by mass (as CaO) of $CaCO_3$ were added to 100% by mass of the coarse powder, and finely pulverized to an average particle size of 0.55 μm (measured by an air permeation method) by a wet ball mill with water as a solvent. The resultant finely pulverized slurry was molded under pressure of about 50 MPa in a magnetic field of about 1.3 T in a compression direction in parallel with the magnetic field direction, while removing the solvent, to obtain pluralities of cylindrical green bodies A each having an axial direction in alignment with the magnetic field direction.

Green bodies B were produced in the same manner as for the green bodies A, except for changing the amounts of $SiO_2$ and $CaCO_3$ added to 100% by mass of the coarse powder to 1.2% by mass and 1.5% by mass (as CaO), respectively.

The green bodies A and B were sintered in the air in a sintering furnace, with temperature-elevating speeds and temperature-lowering speeds shown in Table 2, to obtain sintered ferrite magnets (Samples 1-6). Table 2 shows temperature-elevating speeds in a range from 1100° C. to 1210° C. (sintering temperature), and temperature-lowering speeds in a range from 1210° C. (sintering temperature) to 1100° C. In Samples 1 and 2, sintering was conducted in a combination of eight temperature-elevating speeds of 0.1° C./minute, 0.5° C./minute, 1° C./minute, 2° C./minute, 3° C./minute, 4° C./minute, 5° C./minute and 6.67° C./minute with a temperature-lowering speed of 6° C./minute. In Samples 3-6, sintering was conducted in a combination of a temperature-elevating speed of 1° C./minute or 4° C./minute with five temperature-elevating speeds of 1° C./minute, 4° C./minute, 5° C./minute, 7° C./minute and 10° C./minute. In each sintering, 1210° C. (sintering temperature) was kept for 1 hour, and the temperature was elevated from room temperature to 1100° C. at 7.5° C./minute, and lowered from 1100° C. to room temperature with the sintering furnace open and no power supplied.

TABLE 2

| Sample No. | Amount (% by mass) | | Temperature-Elevating Speed (° C./minute) | Temperature-Lowering Speed (° C./minute) |
| --- | --- | --- | --- | --- |
| | $SiO_2$ | $CaCO_3$[(1)] | | |
| 1 | 0.6 | 0.7 | 0.1-6.67 | 6 |
| 2 | 1.2 | 1.5 | 0.1-6.67 | 6 |
| 3 | 0.6 | 0.7 | 1 | 1-10 |
| 4 | 0.6 | 0.7 | 4 | 1-10 |
| 5 | 1.2 | 1.5 | 1 | 1-10 |
| 6 | 1.2 | 1.5 | 4 | 1-10 |

Note:
[(1)]The amount of $CaCO_3$ was expressed by the amount of CaO.

Figure 2:
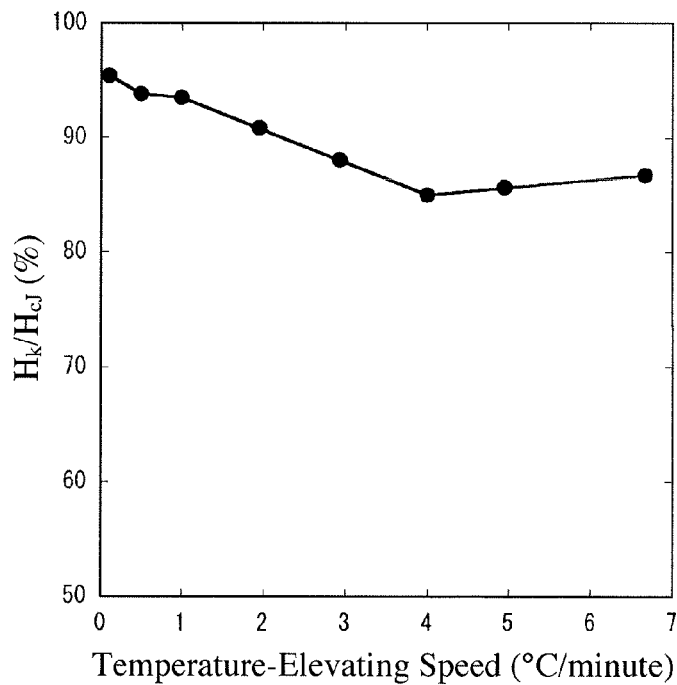
FIG. 2 is a graph showing the relation between a temperature-elevating speed in the sintering step and $H_k/H_{cJ}$ in the sintered ferrite magnet of Sample 1 in Example 1.
Figure 3:
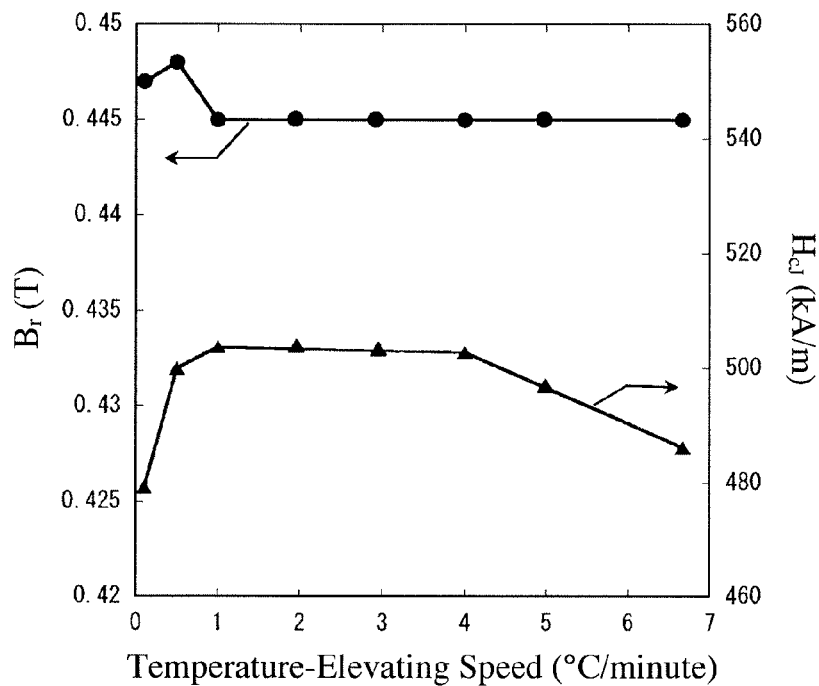
FIG. 3 is a graph showing the relation between a temperature-elevating speed in the sintering step and Br and $H_{cJ}$ in the sintered ferrite magnet of Sample 2 in Example 1.
Figure 4:
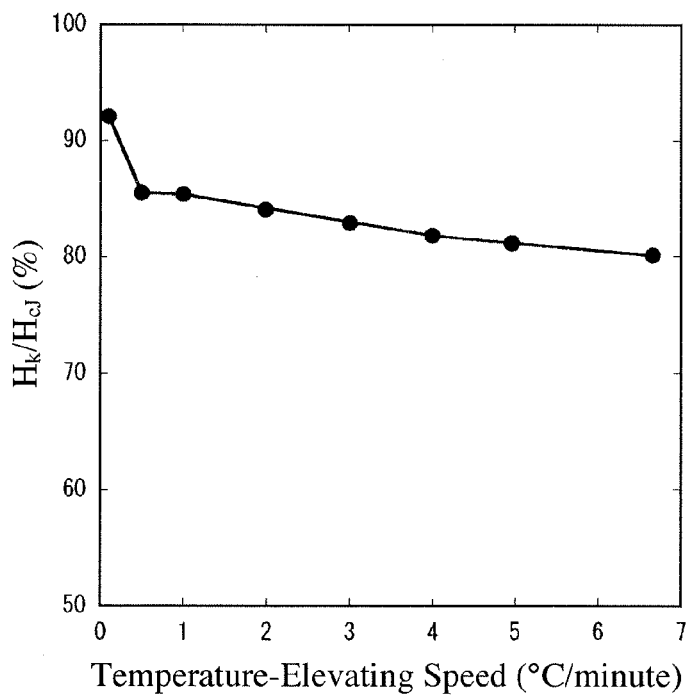
FIG. 4 is a graph showing the relation between a temperature-elevating speed in the sintering step and $H_k/H_{cJ}$ in the sintered ferrite magnet of Sample 2 in Example 1.

With respect to the sintered ferrite magnet of Sample 1, the measurement results of $B_r$ and $H_{cJ}$ are shown in FIG. 1, and the measurement results of $H_k/H_{cJ}$ are shown in FIG. 2. With respect to the sintered ferrite magnet of Sample 2, the measurement results of $B_r$ and $H_{cJ}$ are shown in FIG. 3, and the measurement results of $H_k/H_{cJ}$ are shown in FIG. 4. In FIGS. 1 and 3, black circle plots represent $B_r$, and black triangle plots represent $H_{cJ}$. In $H_k/H_{cJ}$, $H_k$ represents the value of H at a position in the second quadrant at which J is 0.95 $B_r$ in a curve of J (intensity of magnetization) to H (intensity of magnetic field).

Figure 5:
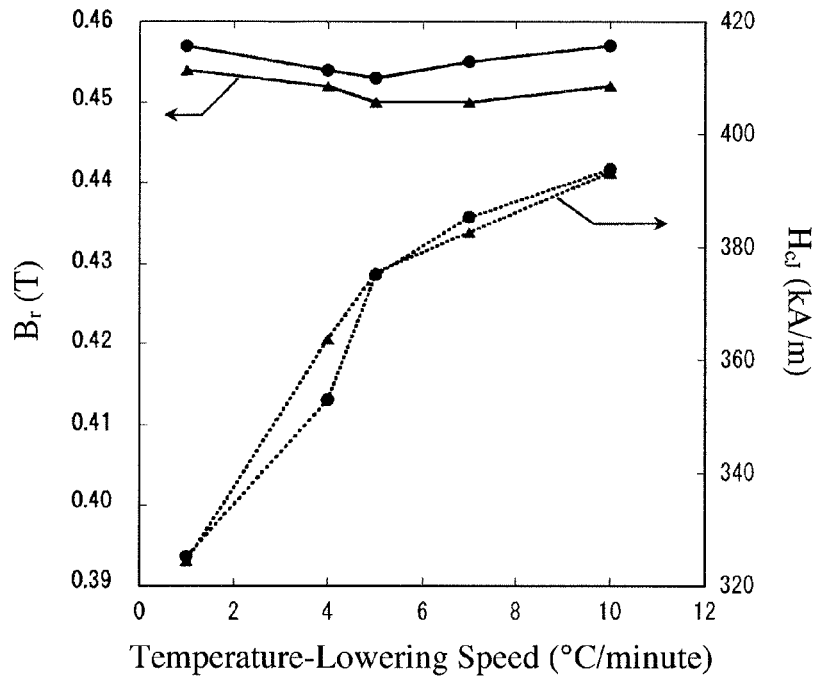
FIG. 5 is a graph showing the relation between a temperature-lowering speed in the sintering step and Br and $H_{cJ}$ in the sintered ferrite magnets of Sample 3 (black circle) and Sample 4 (black triangle) in Example 1.
Figure 6:
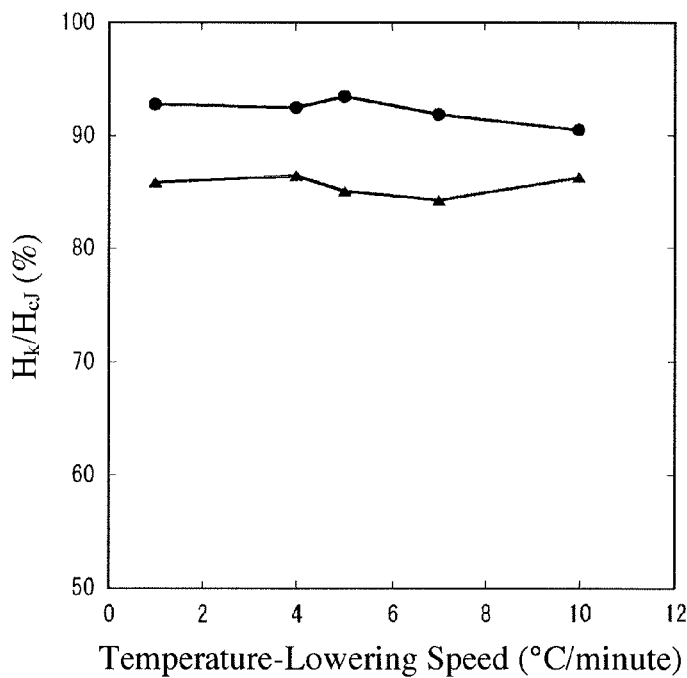
FIG. 6 is a graph showing the relation between a temperature-lowering speed in the sintering step and $H_k/H_{cJ}$ in the sintered ferrite magnets of Sample 3 (black circle) and Sample 4 (black triangle) in Example 1.
Figure 7:
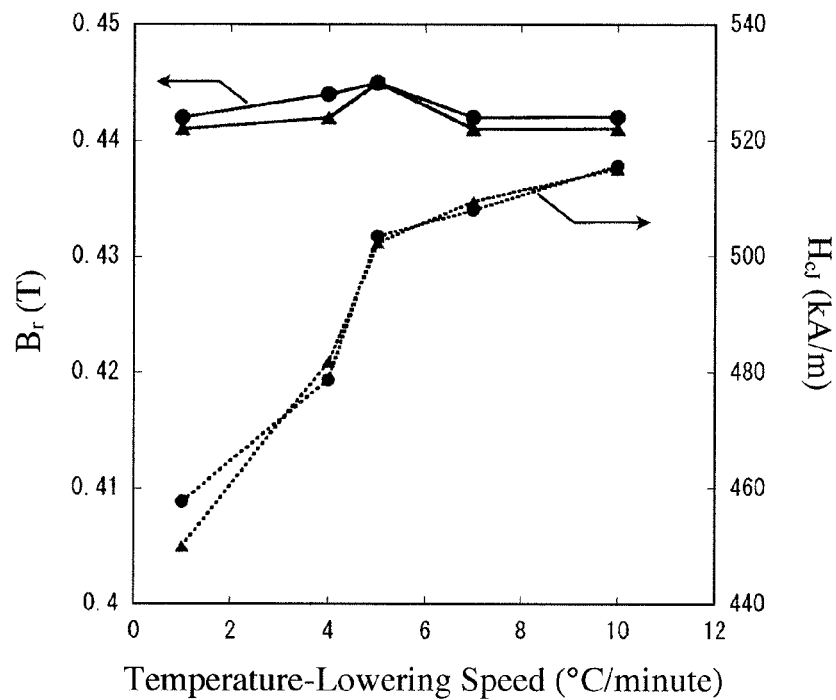
FIG. 7 is a graph showing the relation between a temperature-lowering speed in the sintering step and Br and $H_{cJ}$ in the sintered ferrite magnets of Sample 5 (black circle) and Sample 6 (black triangle) in Example 1.
Figure 8:
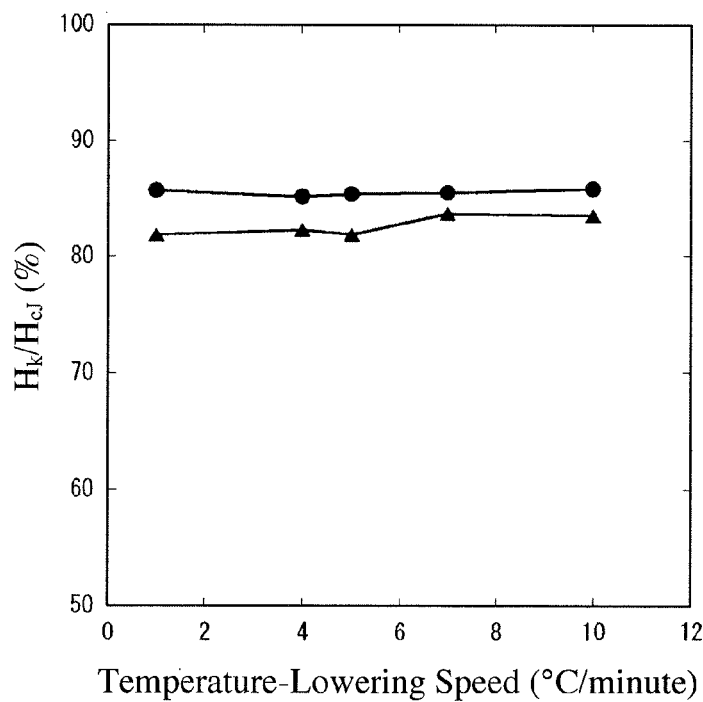
FIG. 8 is a graph showing the relation between a temperature-lowering speed in the sintering step and $H_k/H_{cJ}$ in the sintered ferrite magnet of Sample 5 (black circle) and Sample 6 (black triangle) in Example 1.

With respect to the sintered ferrite magnets of Samples 3 and 4, the measurement results of $B_r$ and $H_{cJ}$ are shown in FIG. 5, and the measurement results of $H_k/H_{cJ}$ are shown in FIG. 6. With respect to the sintered ferrite magnets of Samples 5 and 6, the measurement results of $B_r$ and $H_{cJ}$ are shown in FIG. 7, and the measurement results of $H_k/H_{cJ}$ are shown in FIG. 8. In FIGS. 5 and 7, solid lines represent $B_r$, and dotted lines represent $H_{cJ}$. Also, in FIGS. 5 and 6, black circle plots represent Sample 3, and black triangle plots represent Sample 4. In FIGS. 7 and 8, black circle plots represent Sample 5, and black triangle plots represent Sample 6.

As shown in FIGS. 1 and 2, Sample 1 containing 0.6% by mass of $SiO_2$ and 0.7% by mass (as CaO) of $CaCO_3$ had remarkably improved $H_{cJ}$ with $H_k/H_{cJ}$ kept at 85% or more, despite slight decrease in $B_r$ and $H_k/H_{cJ}$, when the temperature-elevating speed was in a range of 1-4° C./minute.

As shown in FIGS. 3 and 4, Sample 2 to which 1.2% by mass of $SiO_2$ and 1.5% by mass (as CaO) of $CaCO_3$ were added exhibited $H_{cJ}$ remarkably improved to more than 500 kA/m (about 6.3 kOe), with substantially no decrease in $B_r$, in a temperature-elevating speed range of 1-4° C./minute. $H_k/H_{cJ}$ was kept high, though it was slightly lower than 85%.

As shown in FIGS. 5 and 6, both Samples 3 and 4, to which 0.6% by mass of $SiO_2$ and 0.7% by mass (as CaO) of $CaCO_3$ were added with a temperature-elevating speed of 1° C./minute (Sample 3) and a temperature-elevating speed of 4° C./minute (Sample 4), exhibited remarkably improved $H_{cJ}$ with slightly improved $B_r$, at a temperature-lowering speed of 6° C./minute or more. $H_k/H_{cJ}$ was kept 85% or more. $B_r$ and $H_k/H_{cJ}$ were slightly higher as a whole in Sample 3 with a temperature-elevating speed of 1° C./minute.

As shown in FIGS. 7 and 8, both Samples 5 and 6, to which 1.2% by mass of $SiO_2$ and 1.5% by mass (as CaO) of $CaCO_3$ were added with a temperature-elevating speed of 1° C./minute (Sample 5) and a temperature-elevating speed of 4° C./minute (Sample 6), exhibited $H_{cJ}$ remarkably improved to more than 500 kA/m (about 6.3 kOe) with substantially no decrease in $B_r$, at a temperature-lowering speed of 6° C./minute or more. $H_k/H_{cJ}$ was not substantially decreased, and slightly higher as a whole in Sample 5 with a temperature-elevating speed of 1° C./minute. In Sample 5, $H_k/H_{cJ}$ was kept 85% or more. In Sample 6 with a temperature-elevating speed of 4° C./minute, $H_k/H_{cJ}$ was kept high though slightly lower than 85%.

As described above, because the production method of the present invention provides sintered ferrite magnets with improved $H_{cJ}$, while keeping high $B_r$ and high $H_k/H_{cJ}$, they can be made fully thin. In the preferred embodiment, extremely higher-than-ever $H_{cJ}$ of more than 500 kA/m (about 6.3 kOe) was obtained while keeping as high $H_k/H_{cJ}$ as 85% or more.

Example 2

The sintered ferrite magnets of Samples 7-12 were produced in the same manner as in Example 1, except for using the amounts of $SiO_2$ and $CaCO_3$ (as CaO), the temperature-elevating speeds and the temperature-lowering speeds shown in Table 3. Sample 7 is the same as the sintered ferrite magnet of Sample 1 in Example 1, in which the temperature-elevating speed is 1° C./minute. Sample 8 is the same as the sintered ferrite magnet of Sample 2 in Example 1, in which the temperature-elevating speed is 1° C./minute. Sample 9 is the same as the sintered ferrite magnet of in Sample 3 Example 1, in which the temperature-lowering speed is 1° C./minute. Sample 10 is the same as the sintered ferrite magnet of Sample 5 in Example 1, in which the temperature-lowering speed is 1° C./minute.

TABLE 3

| Sample No. | Amount (% by mass) | | Temperature-Elevating Speed (° C./minute) | Temperature-Lowering Speed (° C./minute) |
| --- | --- | --- | --- | --- |
| | $SiO_2$ | $CaCO_3^{(1)}$ | | |
| 7 | 0.6 | 0.7 | 1 | 6 |
| 8 | 1.2 | 1.5 | 1 | 6 |
| 9* | 0.6 | 0.7 | 1 | 1 |
| 10* | 1.2 | 1.5 | 1 | 1 |
| 11* | 0.6 | 0.7 | 10 | 5 |
| 12* | 1.2 | 1.5 | 10 | 5 |

Note:
$^{(1)}$The amount of $CaCO_3$ was expressed by the amount of CaO.
*Comparative Example.

The structures of the resultant cylindrical sintered magnets were observed by backscattered electron images (BSE images) of a field emission-type scanning electron microscope (FE-SEM). The structure of each cylindrical sintered magnet was photographed in three arbitrary cross sections (c-planes) perpendicular to the axial direction. The results are shown in FIGS. 9-14. FIGS. 9-14 are photographs showing the structures of Samples 7-12. Upper photographs, middle photographs and lower photographs in each figure are photographs (magnification: 2000 times on the left side and 5000 times on the right side) taken in three arbitrary fields of the structure cross section.

In FIGS. 9-12, black portions are second grain boundary phases existing among three or more main phases, and all of blackish gray portions, gray portions and whitish gray portions are main phases. In each photograph on the right side, linear portions in grain boundaries between main phases are the first grain boundary phases.

Figure 9:
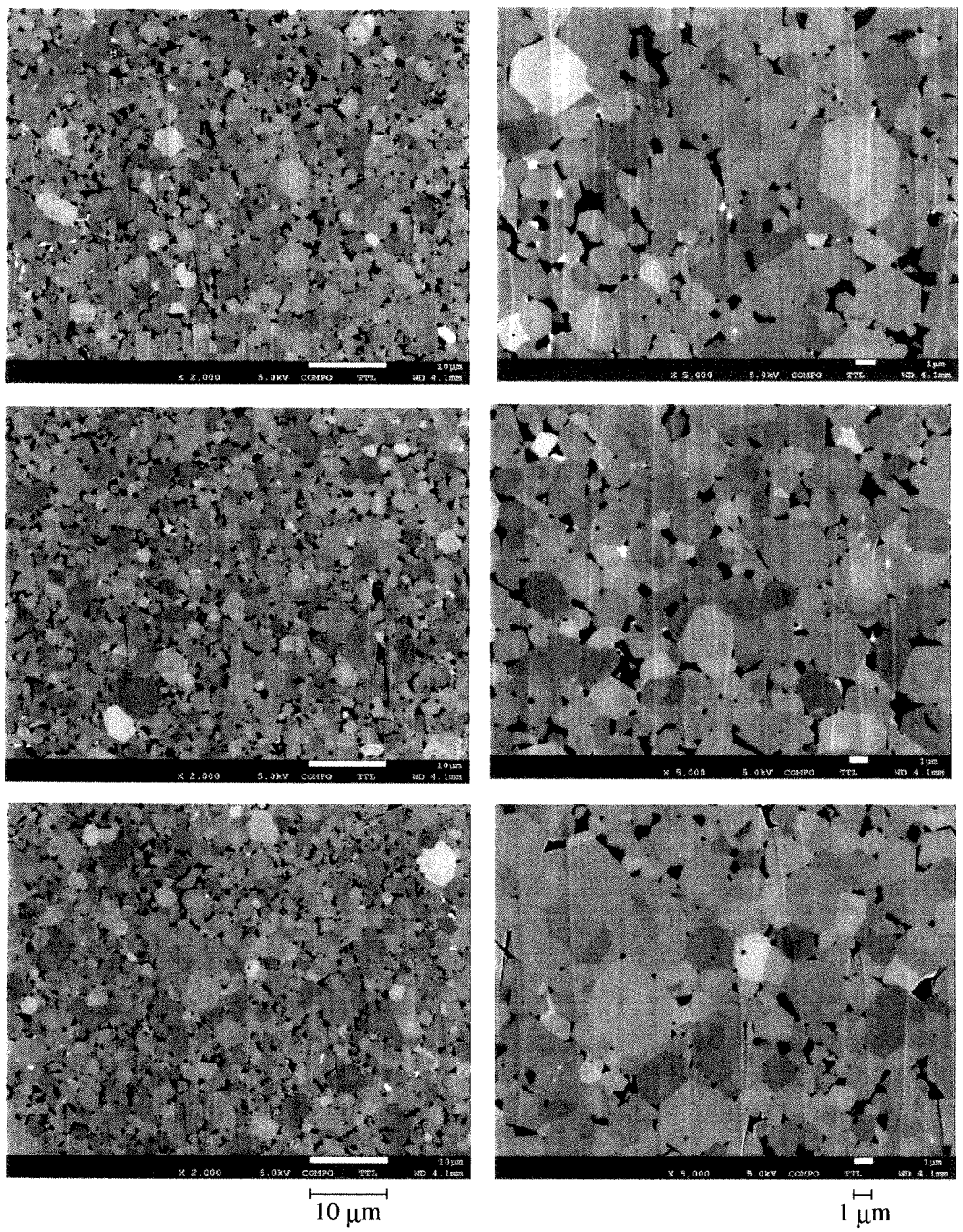
FIG. 9 is a photograph of a backscattered electron image measured by FE-SEM, which shows the structure of the sintered ferrite magnet of Sample 7 in Example 2.
Figure 10:
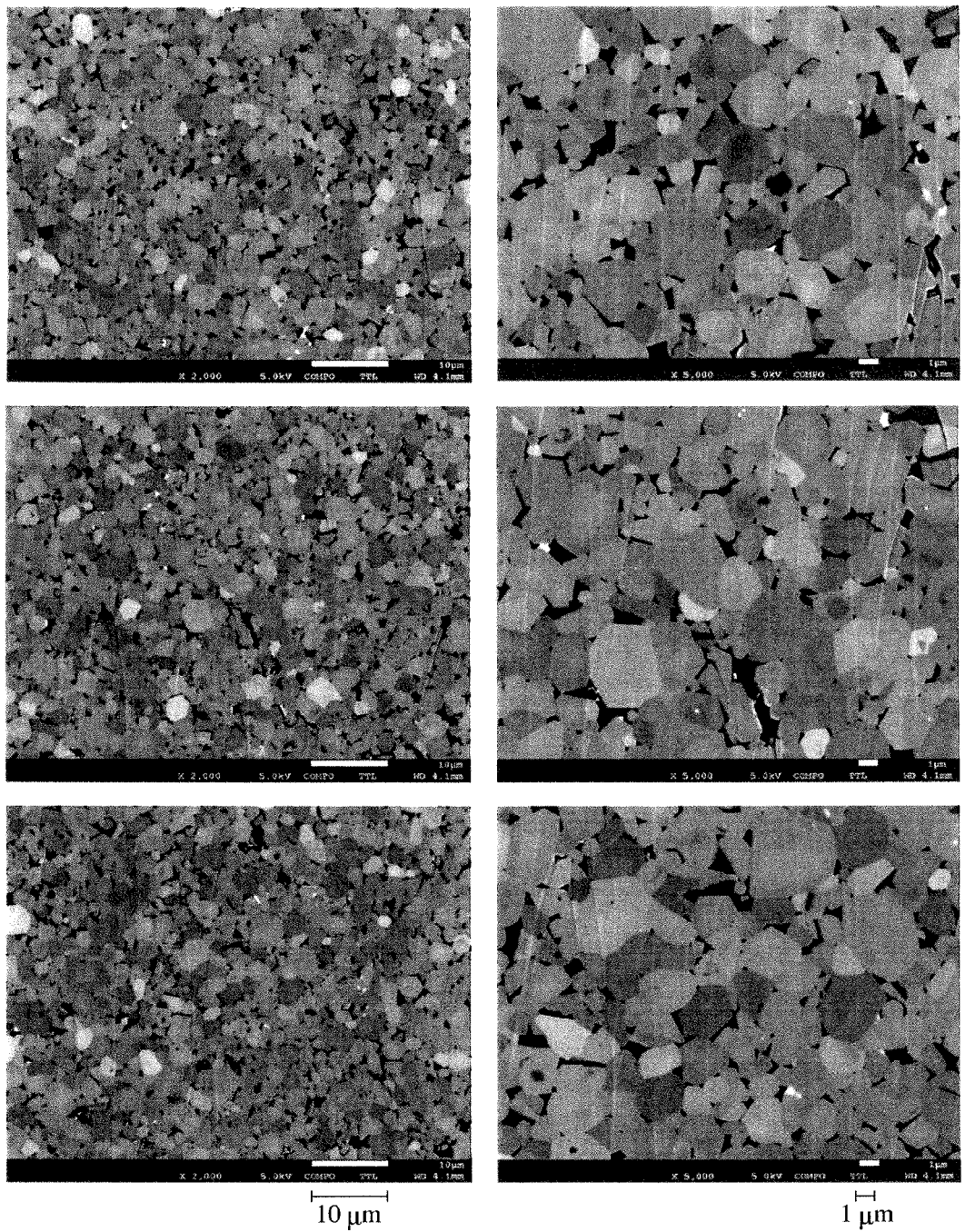
FIG. 10 is a photograph of a backscattered electron image measured by FE-SEM, which shows the structure of the sintered ferrite magnet of Sample 8 in Example 2.
Figure 11:
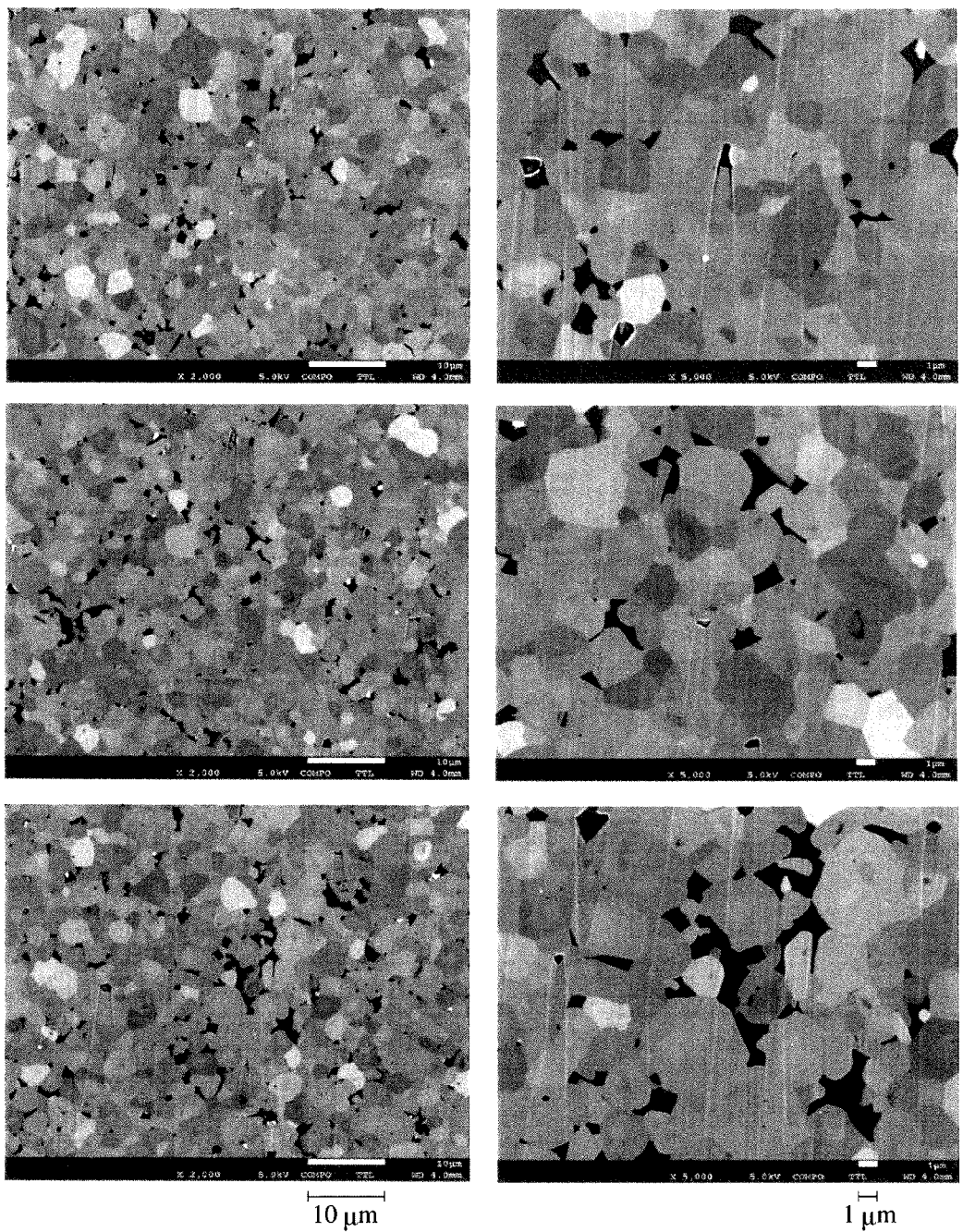
FIG. 11 is a photograph of a backscattered electron image measured by FE-SEM, which shows the structure of the sintered ferrite magnet of Sample 9 in Example 2.
Figure 12:
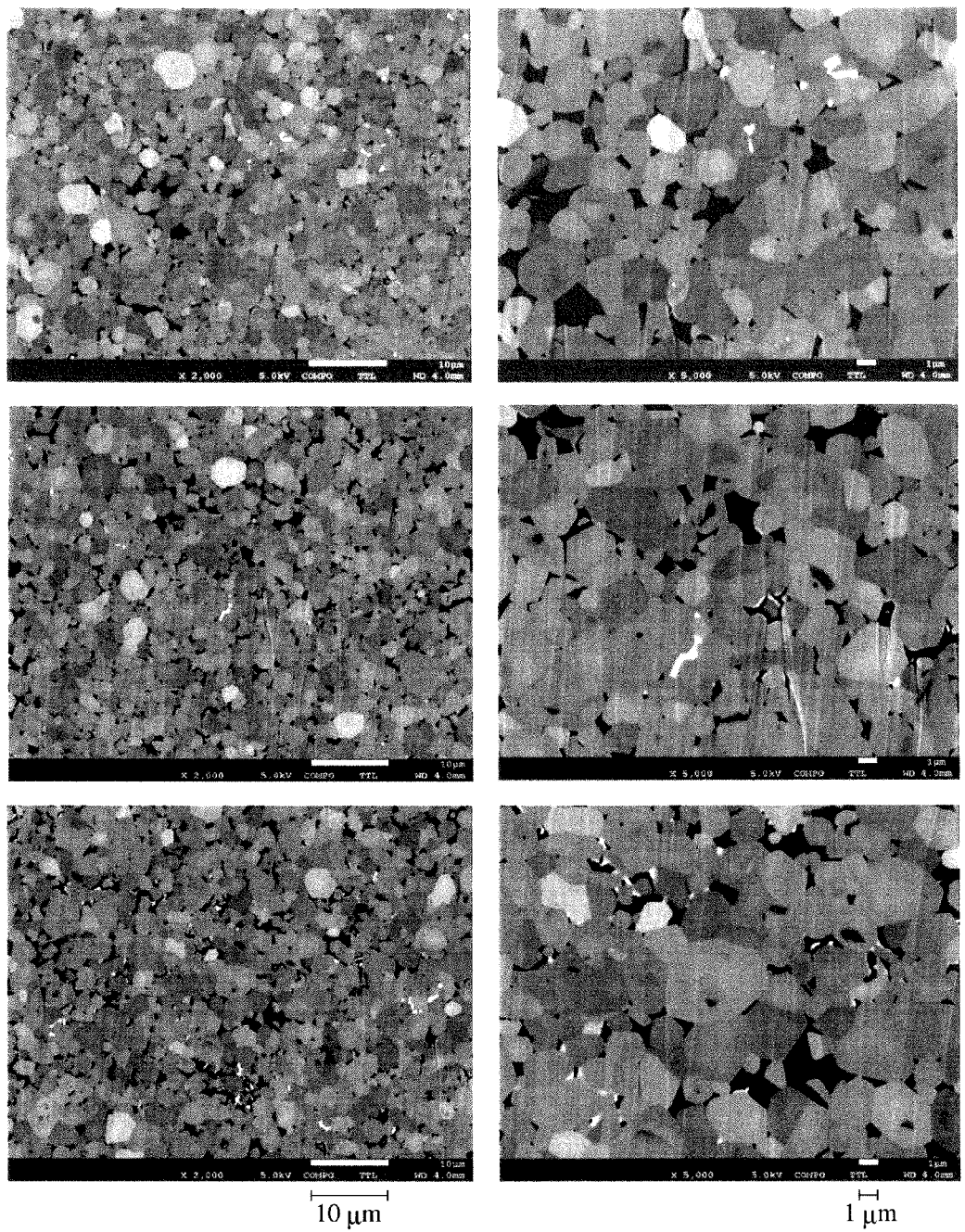
FIG. 12 is a photograph of a backscattered electron image measured by FE-SEM, which shows the structure of the sintered ferrite magnet of Sample 10 in Example 2.
Figure 13:
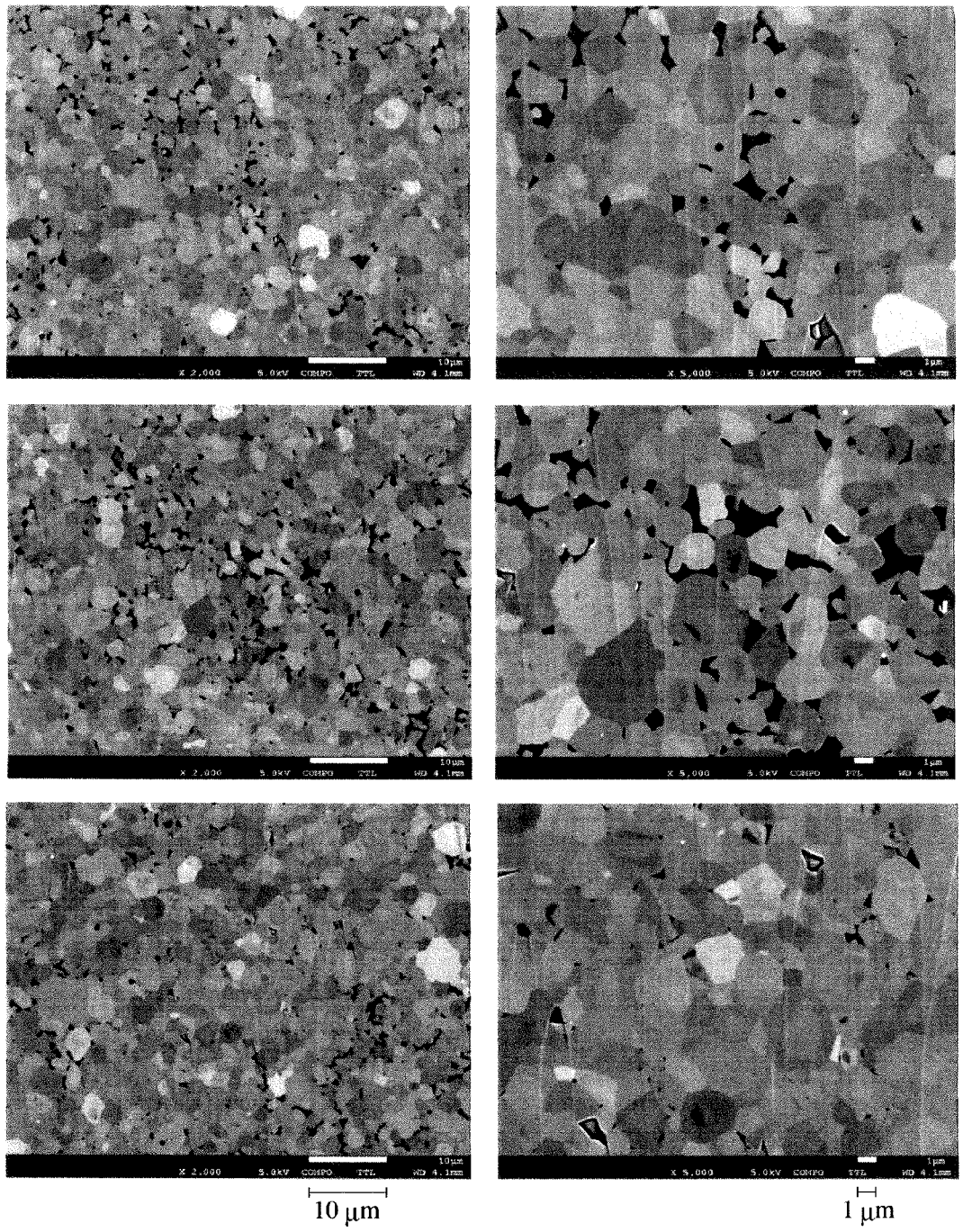
FIG. 13 is a photograph of a backscattered electron image measured by FE-SEM, which shows the structure of the sintered ferrite magnet of Sample 11 in Example 2.
Figure 14:
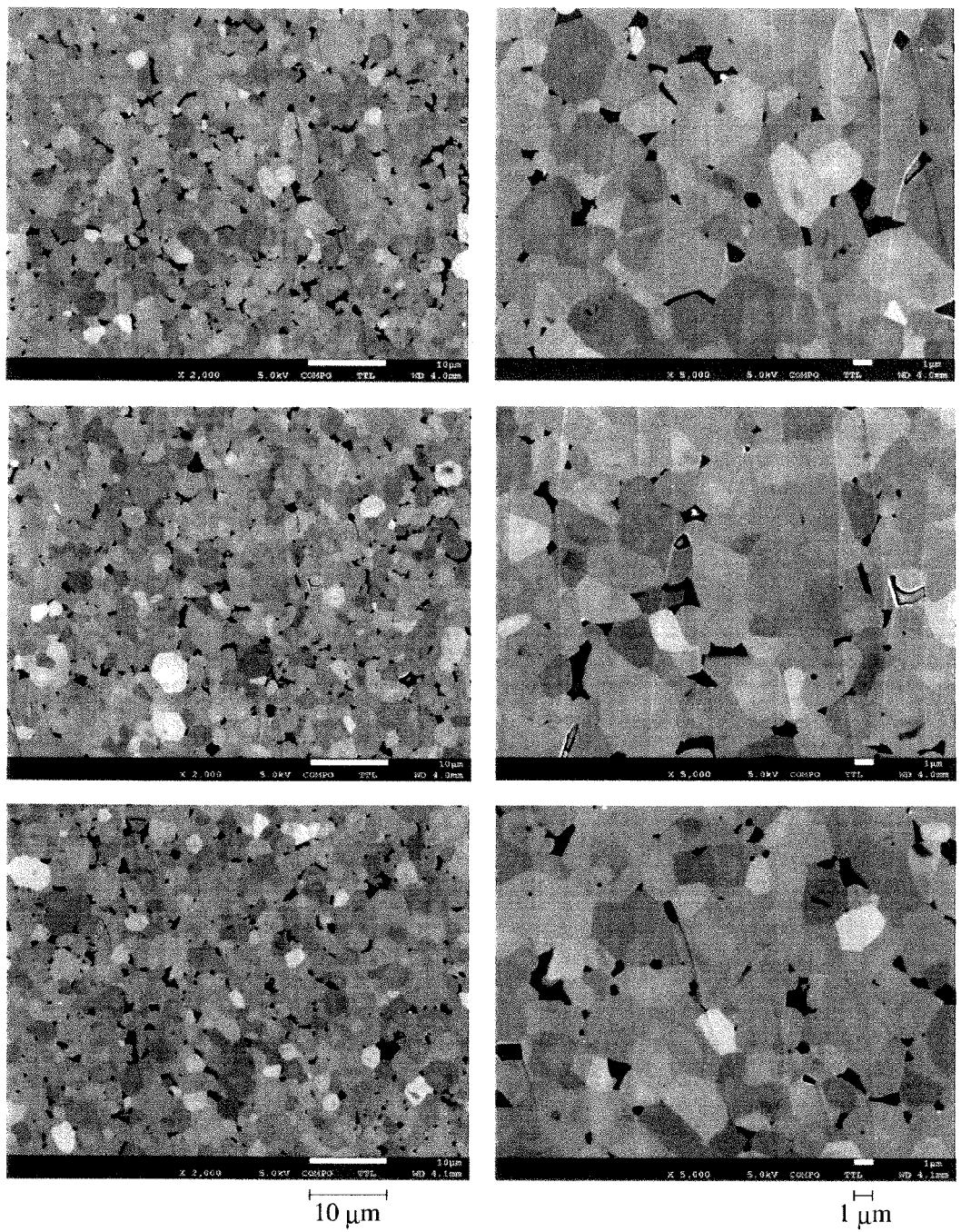
FIG. 14 is a photograph of a backscattered electron image measured by FE-SEM, which shows the structure of the sintered ferrite magnet of Sample 12 in Example 2.

As is clear from FIGS. 9 and 10, the sintered ferrite magnet of the present invention comprised main phases, first grain boundary phases between two main phases, and second grain boundary phases among three or more main phases; the second grain boundary phases being finely dispersed. On the other hand, as is clear from FIGS. 11-14, the second grain boundary phases were unevenly dispersed in the sintered ferrite magnets of Comparative Examples, and extremely large second grain boundary phases were likely contained.

Figure 15:
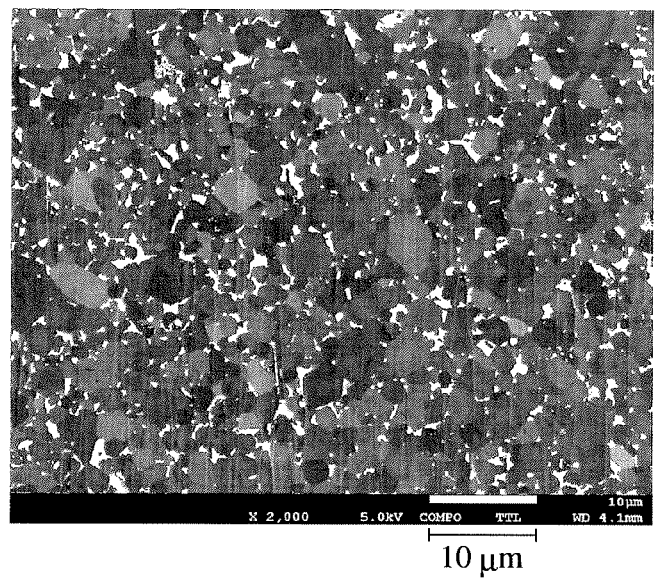
FIG. 15 is a binarized view of a backscattered electron image measured by FE-SEM, which shows the structure of the sintered ferrite magnet of Sample 7 in Example 2.

An arbitrary range of 53×53 μm² in each photograph (magnification: 2000 times) of the structure on the left side in FIGS. 9-14 was binarized to separate the second grain boundary phases from the background image, thereby determining the area and number of all second grain boundary phases. An average area (area/number) of the second grain boundary phases was determined from their total area and number. Further, the total area, number and average area of the second grain boundary phases in three fields in each figure were averaged (average value in three fields). The results are shown in Table 4. An example of binarized image of the upper left photograph (magnification: 2000 times) in FIG. 9 is shown in FIG. 15, in which the second grain boundary phases look white by image treatment. By image analysis, the area and number of white portions (second grain boundary phases) were determined.

TABLE 4

| Sample No. | Figure | | Total Area (μm²) | Number | Average Area (μm²) |
|---|---|---|---|---|---|
| 7 | 9 | Upper | 228.8 | 1258 | 0.182 |
| | | Middle | 231.7 | 1370 | 0.169 |
| | | Lower | 208.4 | 1416 | 0.147 |
| | | Average | 223.0 | 1348 | 0.165 |
| 8 | 10 | Upper | 199.6 | 1161 | 0.172 |
| | | Middle | 203.9 | 1118 | 0.182 |
| | | Lower | 214.4 | 1163 | 0.184 |
| | | Average | 206.0 | 1147 | 0.180 |
| 9* | 11 | Upper | 92.4 | 261 | 0.354 |
| | | Middle | 98.5 | 282 | 0.349 |
| | | Lower | 135.2 | 326 | 0.415 |
| | | Average | 108.7 | 290 | 0.375 |
| 10* | 12 | Upper | 137.7 | 881 | 0.156 |
| | | Middle | 183.3 | 892 | 0.205 |
| | | Lower | 234.2 | 870 | 0.269 |
| | | Average | 185.0 | 881 | 0.210 |
| 11* | 13 | Upper | 102.9 | 541 | 0.190 |
| | | Middle | 141.4 | 549 | 0.258 |
| | | Lower | 110.0 | 614 | 0.179 |
| | | Average | 118.1 | 568 | 0.208 |
| 12* | 14 | Upper | 106.0 | 374 | 0.283 |
| | | Middle | 88.5 | 404 | 0.219 |
| | | Lower | 108.9 | 375 | 0.290 |
| | | Average | 101.1 | 384 | 0.263 |

Note:
*Comparative Example.

As is clear from Table 4, the second grain boundary phases had an average area of less than 0.2 μm² in any sintered ferrite magnets of the present invention, with an average value also less than 0.2 μm² in three fields in each figure. Though the second grain boundary phases partially had an average area of less than 0.2 μm² in the sintered ferrite magnets of Comparative Examples, any average value in three fields was 0.2 μm² or more, indicating that the second grain boundary phases were large as a whole.

The number of the second grain boundary phases was 900 or more in any sintered ferrite magnets of the present invention, while it was less than 900 in any sintered ferrite magnets of Comparative Examples.

Thus, with a temperature-elevating speed of 1-4° C./minute in a temperature range from 1100° C. to a sintering temperature, and a temperature-lowering speed of 6° C./minute or more in a temperature range from the sintering temperature to 1100° C., in the sintering step, the sintered ferrite magnet of the present invention had a structure in which grain boundary phases as fine as having an average area of less than 0.2 μm² were dispersed. Further, 900 or more second grain boundary phases were dispersed in an arbitrary region of 53×53 μm². As is clear in Example 1, Such structure can improve $H_{cJ}$, while keeping high $B_r$ and high $H_k/H_{cJ}$.

On the other hand, the sintered ferrite magnets of Comparative Examples produced with improper temperature-elevating speeds and temperature-lowering speeds in the sintering step had structures in which second grain boundary phases as large as 0.2 μm² or more in average area were segregated. Also, less than 900 second grain boundary phases were dispesed in an arbitrary region of 53×53 μm². Such structure fails to have improved $H_{cJ}$ as shown in Example 1.

Example 3

With respect to the sintered ferrite magnets of Samples 7-12 in Example 2, the compositions of the overall structure, two arbitrary main phases and arbitrary second grain boundary phases were analyzed by FE-SEM (field emission-type scanning electron microscope) and EDX (energy-dispersive X-ray spectroscope) in each of FIGS. 9-14. The composition analysis results are shown in Table 5, in which the compositions are shown by atomic %. The overall composition was analyzed with beams of 100 μm×100 μm, and the main phases and the second grain boundary phases were analyzed with a beam diameter of 1 μm. In Table, "N.D." indicates "not detected."

TABLE 5

| Sample No. | Fig. | Analyzed Position | La Lα | Co Kα | Fe Kα | Ca Kα | Si Kα |
|---|---|---|---|---|---|---|---|
| 7 | 9 | Overall | 4.8 | 2.8 | 84.6 | 6.2 | 1.7 |
| | | Main Phases 1 | 5.0 | 2.9 | 88.4 | 3.7 | N.D. |
| | | Main Phases 2 | 4.8 | 2.9 | 88.3 | 4.0 | N.D. |
| | | Second Grain Boundary Phases | 3.2 | N.D. | 31.2 | 42.5 | 23.1 |
| 8 | 10 | Overall | 4.8 | 2.8 | 84.1 | 6.5 | 1.9 |
| | | Main Phases 1 | 4.8 | 3.0 | 88.3 | 3.8 | N.D. |
| | | Main Phases 2 | 4.9 | 2.9 | 88.2 | 4.0 | N.D. |
| | | Second Grain Boundary Phases | 3.3 | N.D. | 35.2 | 40.7 | 20.7 |
| 9* | 11 | Overall | 4.8 | 2.7 | 86.1 | 5.3 | 1.0 |
| | | Main Phases 1 | 4.7 | 2.6 | 88.8 | 4.0 | N.D. |
| | | Main Phases 2 | 4.9 | 3.1 | 88.2 | 3.8 | N.D. |
| | | Second Grain Boundary Phases | 3.2 | N.D. | 34.4 | 41.7 | 20.7 |
| 10* | 12 | Overall | 4.8 | 2.5 | 83.9 | 6.7 | 2.0 |
| | | Main Phases 1 | 4.8 | 3.0 | 88.6 | 3.7 | N.D. |
| | | Main Phases 2 | 4.5 | 2.9 | 87.9 | 4.7 | N.D. |
| | | Second Grain Boundary Phases | 3.0 | N.D. | 30.6 | 43.7 | 22.7 |
| 11* | 13 | Overall | 5.5 | 2.8 | 83.4 | 7.1 | 1.2 |
| | | Main Phases 1 | 4.9 | 3.1 | 88.2 | 3.8 | N.D. |
| | | Main Phases 2 | 4.9 | 2.6 | 88.4 | 4.1 | N.D. |
| | | Second Grain Boundary Phases | 4.2 | N.D. | 24.4 | 49.1 | 22.3 |
| 12* | 14 | Overall | 5.0 | 2.9 | 85.8 | 5.2 | 1.1 |
| | | Main Phases 1 | 5.1 | 2.6 | 88.4 | 3.8 | N.D. |
| | | Main Phases 2 | 4.9 | 2.5 | 88.9 | 3.7 | N.D. |
| | | Second Grain Boundary Phases | 4.3 | N.D. | 30.2 | 44.3 | 21.3 |

*Comparative Example.

As is clear from Table 5, the second grain boundary phases indispensably contained Si and Ca at a total ratio of 50 atomic % or more to the entire second grain boundary phases. The second grain boundary phases also contained Fe and a small amount of La.

Example 4

The sintered ferrite magnets of Samples 13-16 were produced in the same manner as in Example 1, except that mixing was conducted to provide a composition represented by the formula of $Ca_{1-x-y}La_xA_yFe_{2n-z}Co_z$, wherein x=0.5, y=0, z=0.2 and n=4.8, and that the amounts of $SiO_2$ and $CaCO_3$ (as CaO), the temperature-elevating speeds, the temperature-lowering speeds, and the sintering temperatures shown in Table 6 were used. The measurement results of $B_r$, $H_{cJ}$ and $H_k/H_{cJ}$ of the sintered ferrite magnets are shown in Table 6.

TABLE 6

| Sample No. | Amount (% by mass) | | Temperature-Elevating Speed (° C./minute) | Temperature-Lowering Speed (° C./minute) | Sintering Temperature (° C.) |
|---|---|---|---|---|---|
| | $SiO_2$ | $CaCO_3^{(1)}$ | | | |
| 13 | 0.8 | 0.6 | 1 | 10 | 1200 |
| 14 | 1.6 | 1.5 | 1 | 10 | 1210 |
| 15* | 0.8 | 0.6 | 7 | 4 | 1200 |
| 16* | 1.6 | 1.5 | 7 | 4 | 1210 |

| Sample No. | $B_r$ (T) | $H_{cJ}$ (kA/m) | $H_k/H_{cJ}$ (%) |
|---|---|---|---|
| 13 | 0.429 | 291 | 87.3 |
| 14 | 0.423 | 399 | 88.9 |
| 15* | 0.431 | 270 | 85.2 |
| 16* | 0.426 | 384 | 85.8 |

Note:
$^{(1)}$The amount of $CaCO_3$ was expressed by the amount of CaO.
Note:
*Comparative Example.

In this Example, the Co content (z) was 0.2, while z=0.3 in Examples 1-3. As is clear from Table 6, even with the Co content (z) changed, the sintered ferrite magnets of the present invention produced with a low temperature-elevating speed of 1° C./minute and a high temperature-lowering speed of 10° C./minute had improved $H_{cJ}$ and $H_k/H_{cJ}$ with substantially no decrease in $B_r$, than those of the sintered ferrite magnets of Comparative Examples produced with a temperature-elevating speed of 7° C./minute and a temperature-lowering speed of 4° C./minute.

Though structure photographs in Samples 13 and 14 are not shown, it was confirmed that these sintered ferrite magnets contained main phases, first grain boundary phases between two main phases, and second grain boundary phases among three or more main phases; the second grain boundary phases being dispersed in an arbitrary cross section and having an average area of less than 0.2 μm².

Example 5

The sintered ferrite magnets of Samples 17-22 were obtained in the same manner as in Example 1, except for providing a composition represented by the formula of $Ca_{1-x-y}La_xA_yFe_{2n-z}Co_z$, wherein x=0.5, y=0.05, z=0.3 and n=5.3, using Ba and/or Sr as the element A in amounts shown in Table 7, and using the amounts of $SiO_2$ and $CaCO_3$ (as CaO), the temperature-elevating speeds, the temperature-lowering speeds and the sintering temperature shown in Table 7. The measurement results of $B_r$, $H_{cJ}$, and $H_k/H_{cJ}$ of the sintered ferrite magnets are shown in Table 7.

TABLE 7

| Sample No. | Element A | | Amount (% by mass) | | Tes$^{(2)}$ (° C./minute) | Tls$^{(3)}$ (° C./minute) | Sintering Temperature (° C.) |
|---|---|---|---|---|---|---|---|
| | Sr | Ba | $SiO_2$ | $CaCO_3^{(1)}$ | | | |
| 17 | 0 | 0.05 | 1.2 | 1.5 | 1 | 10 | 1200 |
| 18 | 0.05 | 0 | 1.2 | 1.5 | 1 | 10 | 1200 |
| 19 | 0.025 | 0.025 | 1.2 | 1.5 | 1 | 10 | 1200 |
| 20* | 0 | 0.05 | 1.2 | 1.5 | 7 | 4 | 1200 |
| 21* | 0.05 | 0 | 1.2 | 1.5 | 7 | 4 | 1200 |
| 22* | 0.025 | 0.025 | 1.2 | 1.5 | 7 | 4 | 1200 |

| Sample No. | $B_r$ (T) | $H_{cJ}$ (kA/m) | $H_k/H_{cJ}$ (%) |
|---|---|---|---|
| 17 | 0.443 | 503 | 85.1 |
| 18 | 0.442 | 510 | 85.6 |
| 19 | 0.441 | 505 | 85.0 |
| 20* | 0.445 | 482 | 81.0 |
| 21* | 0.443 | 488 | 82.0 |
| 22* | 0.444 | 488 | 80.9 |

Note:
$^{(1)}$The amount of $CaCO_3$ was expressed by the amount of CaO.
$^{(2)}$Temperature-elevating speed.
$^{(3)}$Temperature-lowering speed.
Note:
*Comparative Example.

This Example contained the element A (y=0.05). As is clear from Table 7, even with the element A contained, the sintered ferrite magnets of the present invention produced with a low temperature-elevating speed of 1° C./minute and a high temperature-lowering speed of 10° C./minute had improved $H_{cJ}$ and $H_k/H_{cJ}$ with substantially no decrease in $B_r$, than those of the sintered ferrite magnets of Comparative Examples produced with a temperature-elevating speed of 7° C./minute and a temperature-lowering speed of 4° C./minute.

Though structure photographs in Samples 17-19 are not shown, it was confirmed that these sintered ferrite magnets contained main phases, first grain boundary phases between two main phases, and second grain boundary phases among three or more main phases; the second grain boundary phases being dispersed in an arbitrary cross section and having an average area of less than 0.2 µm².

EFFECT OF THE INVENTION

The present invention capable of improving $H_{cJ}$ while keeping high $B_r$ and high $H_k/H_{cJ}$ provides a sintered ferrite magnet, which can be made fully thin. Using the sintered ferrite magnets of the present invention, electric parts for automobiles, electric equipment parts, etc. such as various motors, electric generators, speakers, etc., which have high performance with reduced sizes and weights, can be obtained.

The sintered ferrite magnet of the present invention can be suitably used for electric parts for automobiles, electric equipment parts, etc. such as, various motors, electric generators, speakers, etc., contributing to reducing their sizes and weights while improving their performance.

What is claimed is:

1. A method for producing a sintered ferrite magnet comprising main phases of ferrite having a hexagonal M-type magnetoplumbite structure, first grain boundary phases existing between two main phases, and second grain boundary phases existing among three or more main phases; said second grain boundary phases being dispersed in an arbitrary cross section of said sintered ferrite magnet; and said second grain boundary phases having an average area of less than 0.2 µm²; said method comprising the steps of preparing raw material powders comprising metal elements of Ca, La, an element A which is Ba and/or Sr, Fe and Co, which are represented by the general formula of $Ca_{1-x-y}La_xA_yFe_{2n-z}Co_z$, wherein 1−x−y, x, y and z representing the atomic ratios of said metal elements, and n representing a molar ratio meet:
$0.3 \leq 1-x-y \leq 0.65$,
$0.3 \leq x \leq 0.65$,
$0 \leq y \leq 0.2$,
$0.25 \leq z \leq 0.65$, and
$4.5 \leq n \leq 7$;

calcining said raw material powders to obtain a calcined body;
pulverizing said calcined body to powder;
molding said powder to obtain a green body; and
sintering said green body to obtain a sintered body;
0-1.8% by mass of $SiO_2$ and 0-2% by mass (as CaO) of $CaCO_3$ being added to 100% by mass of said calcined body after calcining and before molding; and
said sintering step being conducted with a temperature-elevating speed of 1-4° C./minute in a temperature range from 1100° C. to a sintering temperature, and a temperature-lowering speed of 6° C./minute or more in a temperature range from the sintering temperature to 1100° C.

2. The method for producing a sintered ferrite magnet according to claim 1, wherein the amount of $SiO_2$ added is 1-1.8% by mass, and the amount (as CaO) of $CaCO_3$ added is 1-2% by mass.

3. The method for producing a sintered ferrite magnet according to claim 2, wherein the amount of $SiO_2$ added is 1.1-1.6% by mass, and the amount (as CaO) of $CaCO_3$ added is 1.2-2% by mass.

4. The method for producing a sintered ferrite magnet according to claim 1, wherein 900 or more second grain boundary phases exist in a region of 53×53 µm² in an arbitrary cross section of the sintered ferrite magnet.

5. A sintered ferrite magnet comprising main phases of ferrite having a hexagonal M-type magnetoplumbite structure, first grain boundary phases existing between two main phases, and second grain boundary phases existing among three or more main phases; said second grain boundary phases being dispersed in its arbitrary cross section; and said second grain boundary phases having an average area of less than 0.2 µm²;

wherein the sintered ferrite magnet comprises metal elements of Ca, La, an element A which is Ba and/or Sr, Fe and Co, and 0-1.8% by mass of $SiO_2$; said metal elements having the general formula of $Ca_{1-x-y}La_xA_yFe_{2n-z}Co_z$, wherein 1−x−y, x, y and z representing the atomic ratios of said metal elements, and n representing a molar ratio meet:
$0.3 \leq 1-x-y \leq 0.75$,
$0.2 \leq x \leq 0.65$,
$0 \leq y \leq 0.2$,
$0.25 \leq z \leq 0.65$, and
$3 \leq n \leq 6$.

6. The sintered ferrite magnet according to claim 5, wherein 900 or more second grain boundary phases exist in a region of 53×53 µm² in an arbitrary cross section of the sintered ferrite magnet.

* * * * *